United States Patent [19]

Ohtaki et al.

[11] 4,130,355
[45] Dec. 19, 1978

[54] PHOTOGRAPHIC CAMERA WITH AN AUTOMATIC EXPOSURE CONTROL ADAPTER UNIT DETACHABLY MOUNTED THEREON

[75] Inventors: Shohei Ohtaki; Soichi Nakamoto, both of Machida; Tomonori Iwashita, Chofu; Yoshiaki Watanabe, Fujisawa; Susumu Kozuki, Kanagawa, all of Japan

[73] Assignee: Canon Kabushiki Kaisha, Tokyo, Japan

[21] Appl. No.: 740,310

[22] Filed: Nov. 9, 1976

Related U.S. Application Data

[63] Continuation-in-part of Ser. No. 575,003, May 6, 1975, abandoned.

[30] Foreign Application Priority Data

May 7, 1974 [JP] Japan ................................ 49-50499

[51] Int. Cl.² ............................................. G03B 7/16
[52] U.S. Cl. ...................................... 354/33; 354/38; 354/60 R; 354/60 F
[58] Field of Search ..................... 354/29, 36, 38, 50, 354/51, 60 R, 32, 33, 60 F

[56] References Cited

U.S. PATENT DOCUMENTS

| | | | |
|---|---|---|---|
| 3,733,984 | 5/1973 | Yata | 354/51 |
| 3,812,499 | 5/1974 | Hayashi et al. | 354/51 |
| 4,011,569 | 3/1977 | Mashimo et al. | 354/36 |

*Primary Examiner*—Russell E. Adams
*Attorney, Agent, or Firm*—Toren, McGeady and Stanger

[57] ABSTRACT

An automatic exposure control system permitting for a photographic camera to make an exposure in either of the shutter preselection automatic exposure range and the diaphragm preselection automatic exposure range is established by combination of an adapter unit with the camera. This adapter unit has a housing attachable to and detachable from the camera body, and includes an exposure operation and control circuit capable, upon preselection of an exposure time, of deriving an exposure value representing an effective exposure aperture, and, upon preselection of diaphragm value, of deriving an exposure value representing an exposure time. Responsive to the output of the adapter unit, the control device in the camera body controls operation of the shutter and diaphragm mechanisms thereof selectively in accordance with the exposure value derived from said exposure operation and control circuit. The provision for permitting the camera to make an exposure in an automatic flash exposure range is also made at the exposure operation and control circuit of the adapter unit in a manner to determine the period of energization of a flash unit associated with the camera.

54 Claims, 22 Drawing Figures

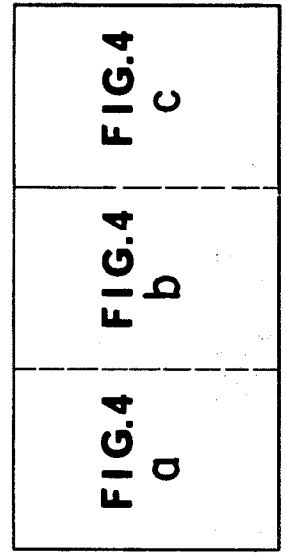
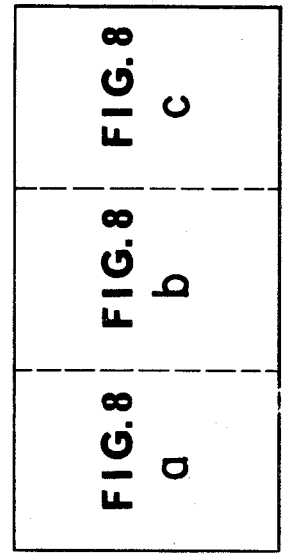
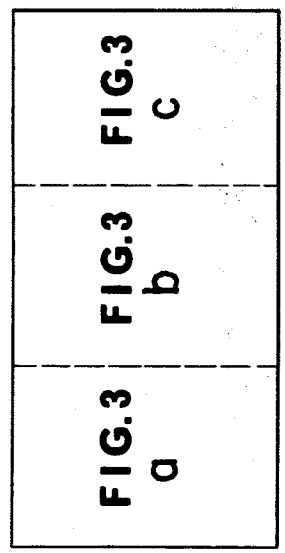
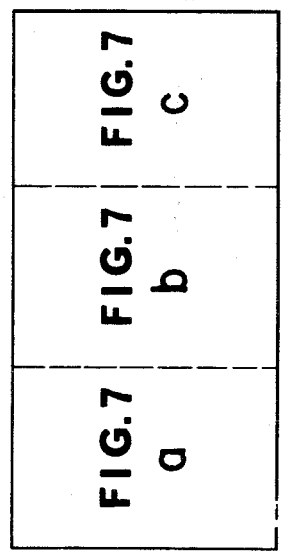

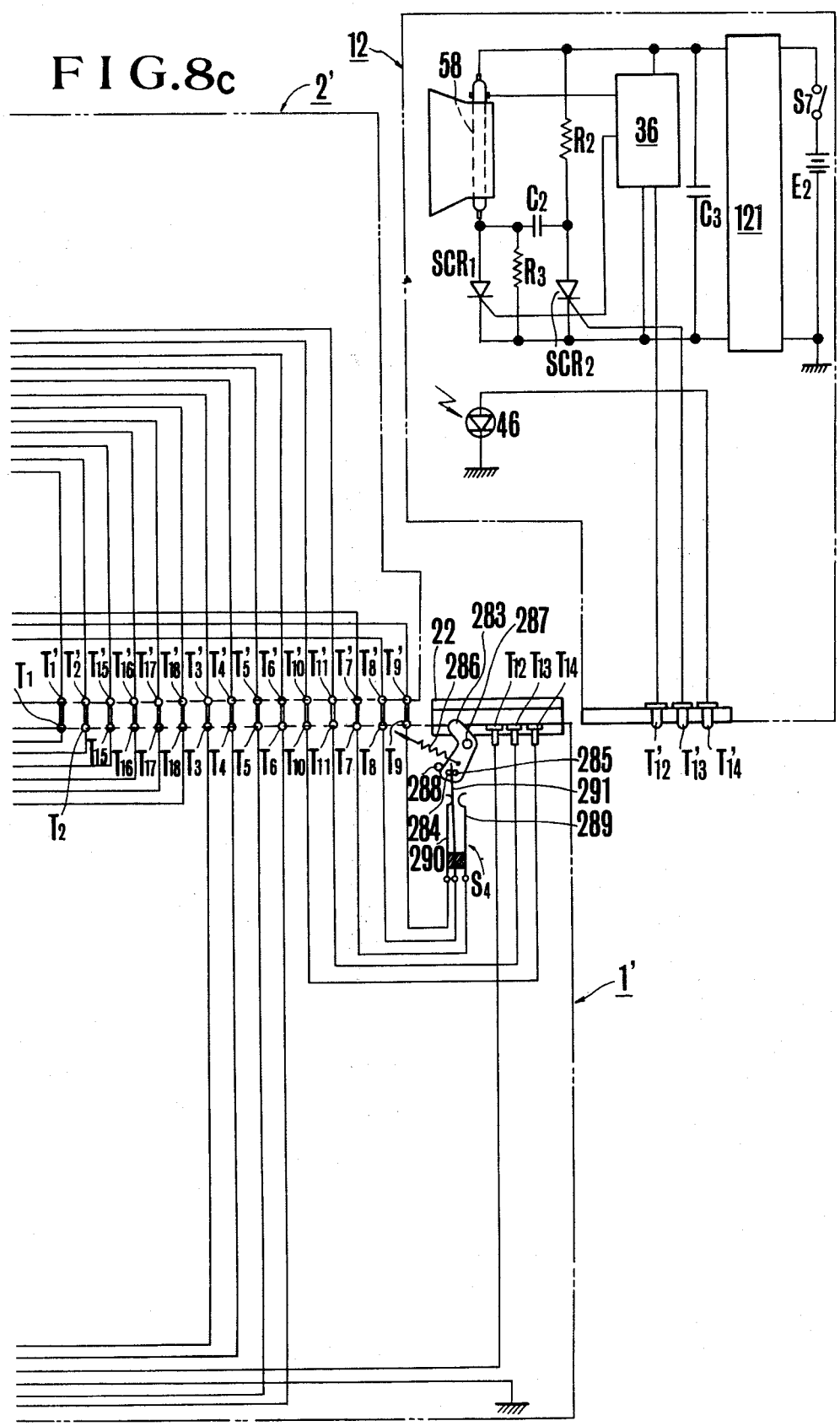

PHOTOGRAPHIC CAMERA WITH AN AUTOMATIC EXPOSURE CONTROL ADAPTER UNIT DETACHABLY MOUNTED THEREON

CROSS-REFERENCE TO RELATED APPLICATIONS

This is a continuation-in-part application of prior application Ser. No. 575,003 filed on May 6, 1975, now abandoned.

BACKGROUND OF THE INVENTION

1. Field of the Invention

This invention relates to photographic cameras, and, more particularly, to an automatic exposure control system which is established by combination of a photographic exposure operation and control adapter unit with a camera. Still more particularly, it relates to an adapter unit which permits the selection of the exposure time preselection automatic daylight exposure range, exposure aperture preselection automatic daylight exposure range and automatic flash exposure range in which an exposure is made by the camera.

2. Description of the Prior Art

There are known two automatic exposure control methods, one of which is to control operation of the diaphragm mechanism in automatic response to preselection of an exposure time, namely the so-called "shutter preselection automatic exposure aperture control method" (hereinafter abbreviated as "shutter preselection type method"), and another method which is to control operation of the shutter mechanism in automatic response to preselection of an exposure aperture, namely, the so-called "diaphragm preselection automatic exposure time control method" (hereinafter abbreviated as "diaphragm preselection type method").

Of these two methods, the shutter preselection type method provides the advantage of permitting for the photographer to select a suitable exposure time based on this personal experience and insight so as to reduce the percentage of image-oscillation recorded photographs, but it provides the disadvantage that the exposure value representing an effective exposure aperture derived from the exposure operation and control device of the camera can not be observed prior to making an exposure by the photographer who is accordingly incapable of adjusting the depth of image field to a desired level.

On the other hand, the diaphragm preselection type method provides the advantage of permitting for the photographer to adjust the depth of image field as desired prior to making an exposure, but it has the disadvantage of increasing the percentage of image-oscillation recorded photographs taken particularly when dark objects are photographed with increased exposure times which can not be taken into account by the photographer prior to making an exposure. These two methods of automatic exposure control have both merits and demerits. In application to practical photography, therefore, proper selection of the shutter preselection and diaphragm preselection automatic exposure control ranges is required case by case to increase the percentage of photographs taken under such situation which will be found acceptable.

Most of the commercially available cameras are equipped with only one of these shutter preselection and diaphragm preselection automatic exposure control ranges, and moreover, the control devices therefor are generally incorporated in the camera bodies. With these type cameras, however, it is, of course, impossible for the camera equipped with the shutter preselection automatic exposure range to make an exposure in the diaphragm preselection automatic exposure range, and, conversely, it is of course impossible for the camera equipped with the diaphragm preselection automatic exposure range to make an exposure in the shutter preselection automatic exposure control range.

On the other hand, camera with adapter units detachably mounted thereon for assisting the camera in making an exposure either in the shutter preselection automatic exposure range or in the diaphragm preselection automatic exposure range have found relatively wide acceptance by the public. As far as is known, however, there has been developed no single adapter until now which when associated with a camera makes it possible for the camera to make an exposure by selection of the shutter preselection and diaphragm preselection automatic exposure ranges. Therefore, if the photographer desires to make an exposure by selection of these two automatic exposure ranges, he must be provided with two types of adapter units, one of which performs the shutter preselection mode and another type adapter unit which performs the diaphragm preselection mode. This will be very inconvenient for the photographer.

To solve the above mentioned problems arising from the provision for permitting selection of the shutter preselection and diaphragm preselection automatic exposure ranges made in the combination of the two types adapter units, a solution has been proposed, as for example, in U.S. Pat. No. 3,544,104 which discloses a camera equipped with these two automatic exposure ranges. In order to switch the camera between these two ranges, there is provided an aperture plate having an opening arranged in front of a photosensitive element and carrying both an operating member of a switch and a slider engaging a resistor. If the photographer desired to make an exposure in the shutter preselection automatic exposure range, the aperture plate is manually moved to set a pointer provided therein to a desired shutter speed, thereby the resistor is brought into connection with shutter control circuit through the above mentioned operating member, while the photosensitive element is brought into connection with an exposure meter circuit for automatically determining an effective exposure aperture. On the other hand, if an exposure in the diaphragm preselection automatic exposure range is desired, the aperture plate is manually moved to set the pointer to a desired diaphragm value, thereby the resistor is brought into connection with the exposure control circuit through the operating member, while the photosensitive element is brought into connection with the shutter control circuit for automatic control of the exposure time.

Such an automatic exposure control apparatus provided with the shutter preselection automatic exposure range and the diaphragm preselection automatic exposure control range is itself, however, relatively complicated in construction, and is increased in bulk and weight, thereby creating a large difficulty in incorporating the apparatus in a compact camera due to the limitation of the space available in the camera body without sacrificing the simplicity of the internal structure of the camera and the manageability thereof due to an increase in the bulk and weight of the camera body. Another disadvantage is to increase the production cost of the camera. Further, it is to be noted that such a camera necessarily permits only the automatic exposure control always in making an exposure but not the non-automatic exposure control in making an exposure with manual settings of both the shutter speed and the diaphragm value which is an important function of the camera, thereby giving an additional disadvantage of limiting the range of application of the camera to photography.

SUMMARY OF THE INVENTION

Accordingly, an object of the present invention is to eliminate all of the above mentioned conventional drawbacks and to provide a novel photographic exposure operation and control adapter unit for use with a camera.

Another object of the invention is to provide a photographic camera with an adapter unit detachably mounted thereon for making it possible for the shutter and diaphragm mechanisms provided in the camera body to make an exposure in either of the shutter preselection and diaphragm preselection automatic exposure ranges without sacrificing any functions of the mechanisms of the camera body, thereby eliminating all of the disadvantages attendant on the camera of the conventional type described.

Still another object of the invention is to provide a finder adapter for a photographic camera which is attachable to and detachable from the camera body at a portion of the view finder thereof and which includes a part of the view finder optical system of the camera and an exposure operation and control circuit capable, upon reselection of a shutter speed, of automatically deriving an exposure aperture, and, upon preselection of a diaphragm value, of automatically deriving an exposure time, thereby the camera with the finder adapter detachably mounted thereon is provided both with the preselection automatic exposure range and the diaphragm preselection automatic exposure range without sacrificing the non-automatic exposure control function of the camera.

A further object of the invention is to provide a novel exposure operation and control adapter unit for automatic exposure control which serves to facilitate a high standard systematization of a camera with its objective lens system and view finder optical system, for example, being made interchangeable, and which when associated with the camera permits for the camera to make an exposure in either of the shutter preselection and diaphragm preselection automatic exposure ranges.

A furthermore object of the invention is to provide a novel photographic exposure operation and control adapter unit which when associated with a camera permit not only for the camera to make an exposure in either of the shutter preselection and diaphragm preselection automatic daylight exposure ranges, but also for a flash unit associated with the camera to automatically control the amount of flash energy emitted therefrom in accordance with the correct flash lighting condition, thereby facilitating simplification of the internal structures of the camera body and flash unit along with the cost down thereof.

Other objects, features and advantages of the invention will become apparent from the detailed description taken in conjunction with the accompanying drawing in which like numbers have been employed in the different figures to denote the same parts and wherein:

BRIEF DESCRIPTION OF THE DRAWINGS

FIGS. 8a, 8b and 8c are a schematic view, partly in block form, of one example of the construction, arrangement and circuitry of the essential parts of the exposure operation and control adapter unit, camera body, objective lens mount and flash unit according to the embodiment of FIGS. 6, 7 and 8.

DETAILED DESCRIPTION OF THE PREFERRED EMBODIMENTS

Figure 1:
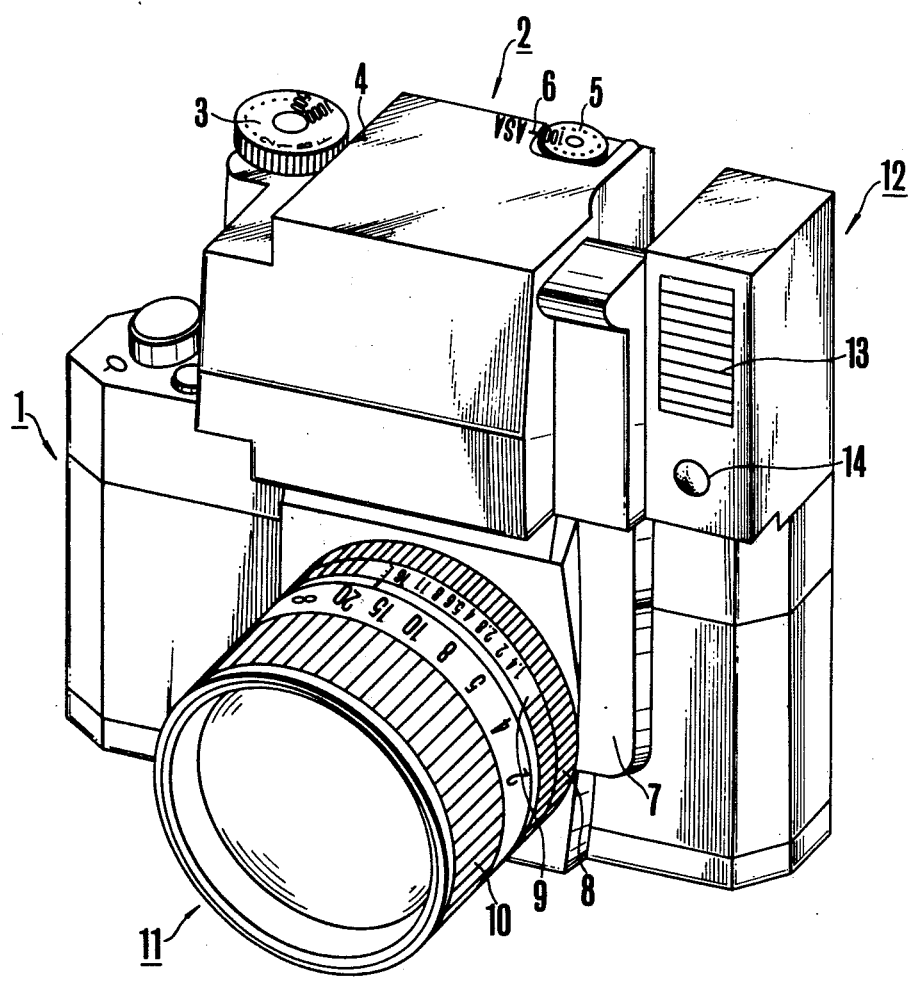
FIG. 1 is a perspective view of one embodiment of an exposure operation and control adapter unit according to the present invention as detachably mounted on a single lens reflex camera with a flash unit mounted thereon.

Referring to FIGS. 1, 2, 3 and 4, there is shown one embodiment of the invention as applied to a single lens reflex camera 1, in which the lens aperture mechanism provided in the interchangeable objective lens mount 11 is operatively connected through the camera body 1 and an additional signal transmitting member 7 to an exposure operation and control adapter unit 2, and a first and second shutter speed selector are provided in the exposure operation and control adapter unit 2.

In FIG. 1, the first shutter speed selector is shown as constructed in the form of a dial 3 arranged to select a relatively fast shutter speed, for example, faster than one second and having a non-adjusting position where the camera makes an exposure in the diaphragm preselection automatic exposure range. 4 is an index mark for the dial 3. A film sensitivity selector dial 5 operates with an index mark 6. The objective lens mount 11 is fixedly secured to the camera body 1 by means of a ring 8, and is provided with a diaphragm presetting ring 9, a distance-adjusting ring 10 and objective lens system mounted therein. The camera body 1 further carries a flash unit 12 having a flash light emitting window 13 and a reflection light receiving window 14.

Figure 2:
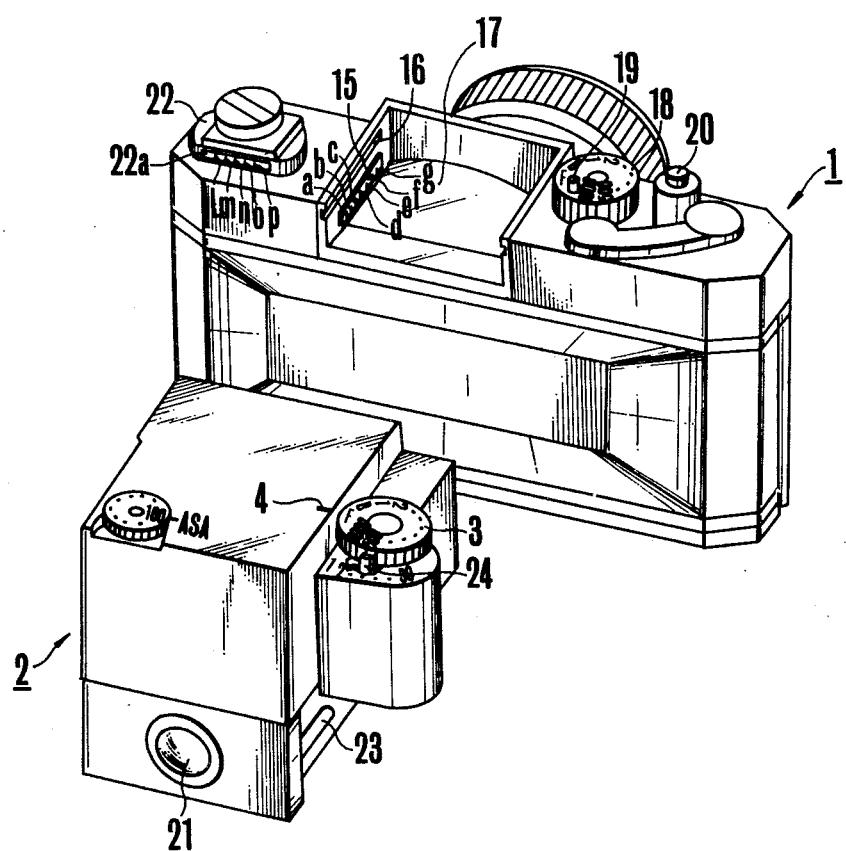
FIG. 2 is a perspective view of the exposure operation and control adapter unit of FIG. 1 as detached from the camera body.

In FIG. 2, the camera body 1 without the exposure operation and control adapter unit 2 and flash unit 12 is illustrated as having a connector terminal assembly 15 with seven connector terminals a, b, c, d, e, f and g arranged along a common line adjacent a guide groove 16 which serves to mount the exposure operation and control adapter unit 2 in a predetermined location on the camera body 1. 17 is a condenser lens constituting part of the view finder system of the camera. 18 is a shutter speed selector dial on the camera side having an upwardly extending pin 19 through which the shutter speed selector dial 18 is connected to the dial 3 of the exposure operation and control adapter unit 2 when unit 2 is attached to the camera body. 20 is a shutter release button. A mount for the flash unit 12 is indicated at 22 with a connector terminal assembly 22a having five connector terminals, l, m, n, o and p, for electrical connection with the circuitry of the flash unit 12. The exposure operation and control adapter unit 2 is provided with an eye-piece 21 which constitutes part of the view finder, a rail 23 for sliding engagement with a groove provided on the opposite side wall to that having groove 16, and a second shutter speed selector constructed in the form of a lever 24.

Figure 3A:
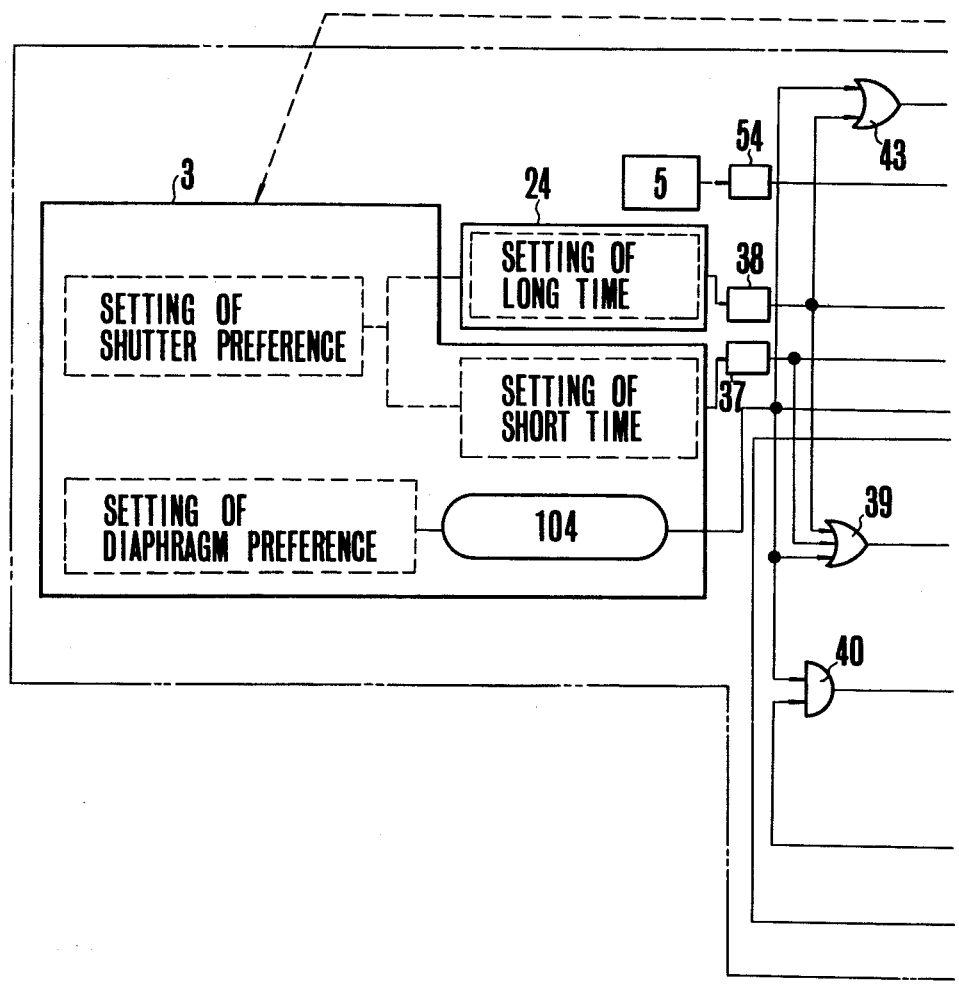
FIG. 3 is a block diagram schematically illustrating an automatic exposure control system for daylight and flash photography which is established by combination of the exposure operation and control adapter unit, camera body, interchangeable lens aperture mechanism and flash unit according to the embodiment of FIGS. 1 and 2.
Figure 3B:
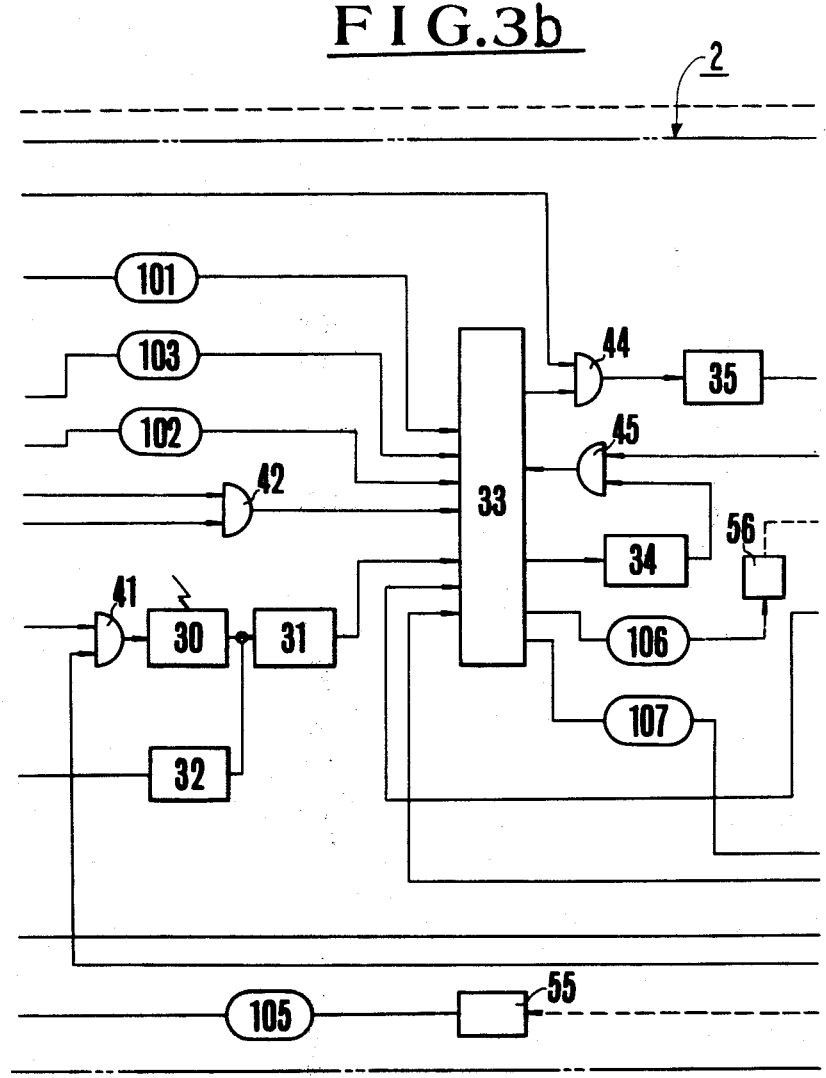
Figure 3C:
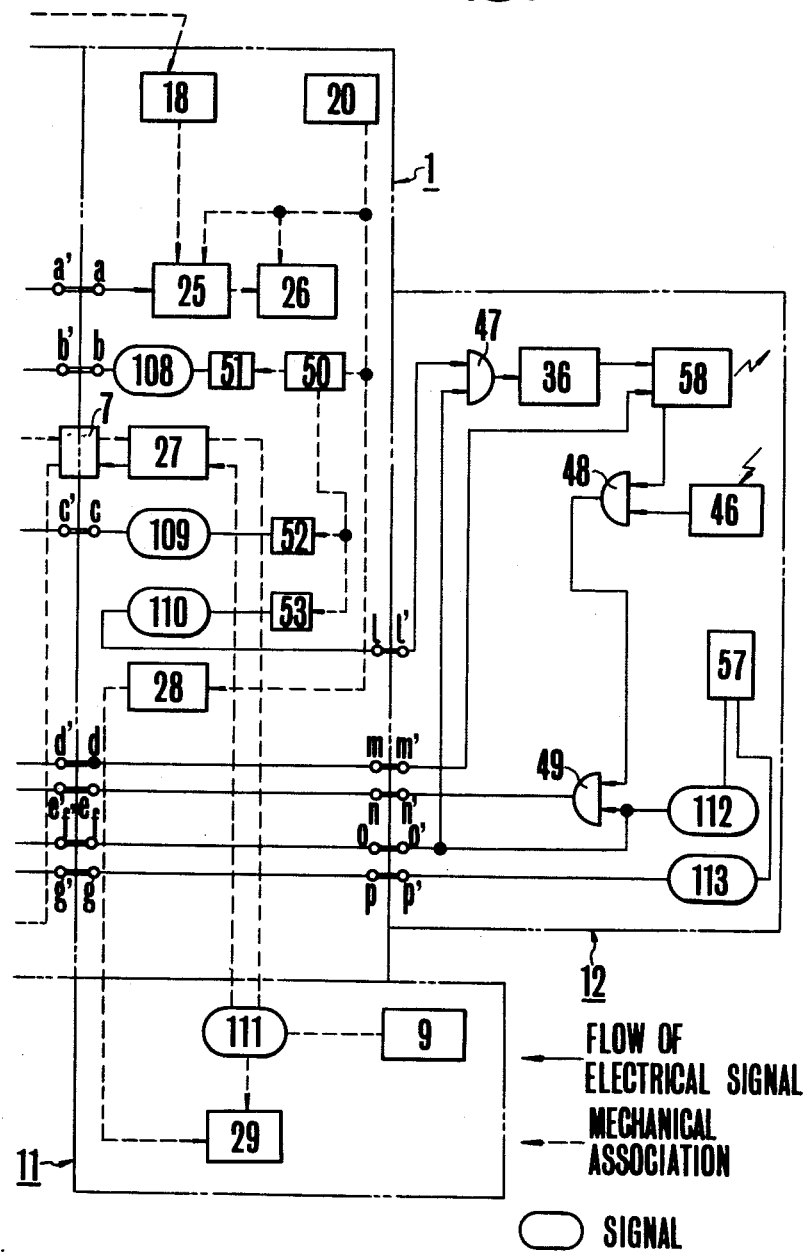

With reference to FIG. 3, there is shown an automatic exposure control system for daylight and flash photography which is established by combination of the camera body 1, exposure operation and control adapter unit 2, objective lens mount 11, and flash unit 12. The camera body 1 includes a shutter mechanism 26 and a control device 25 for the shutter mechanism 26 arranged to be cooperative with the shutter speed selector dial 18. The shutter mechanism 26 is connected to the shutter release button 20. With this arrangement, when the selector dial 18 is operated to select a desired shutter speed, the control device 25 is set to a corresponding operative position where when the shutter release button 20 is actuated, the shutter 26 is opened until the duration of the exposure interval determined by the selector dial 18 is terminated, as the operation of the shutter mechanism 26 is controlled by the control device 25. The camera body 1 further includes a diaphragm value signal transmitting mechanism 27 which is brought into mechanical connection with the diaphragm value signal transmitting arm 7 when the arm 7 is attached to the camera body 1 and which is also brought into mechanical connection with the diaphragm presetting ring 9 when the lens mount 11 is mounted on the camera body 1. The lens mount 11 has a lens aperture mechanism 29 which is brought into mechanical connection with an automatic diaphragm operating mechanism 28 as well as with the shutter release button 20 when the lens mount 11 is mounted on the camera body 1. With this arrangement, when the shutter release button 20 is actuated, the automatic diaphragm operating mechanism operates with the lens aperture mechanism 29 to decrease the size of the aperture from the maximum possible value of the preselected value before the shutter 26 is opened.

A reflex mirror 50 of construction known in the art is moved from its viewing position to its non-viewing position when the shutter release button 20 is actuated, thereby mirror-up signal generating means 51 produces a mirror-up signal 108, while count start signal generating means 52 and flash start signal generating means 53 produce respectively a count start signal 109 which is directed to the shutter control device 25 and a flash start signal 110 which is directed to the flash unit 12. These signal generating means 51, 52 and 53 may be formed with switches cooperating with the pivotal reflex mirror 50.

The exposure operation and control adapter unit 2 includes an exposure operation and control circuit 33 capable upon preselection of a shutter speed, of deriving an exposure value representing an effective exposure aperture, and, upon preselection of a diaphragm value, of deriving an exposure value representing an exposure time, and further, upon actuation of a flash unit 12 associated with the camera body 1, capable of deriving a flash exposure value. The exposure operation and control circuit 33 also serves as a timing circuit for the shutter control device 25 of the camera body. Connected to inputs of exposure operation and control circuit 33 are first and second shutter time signal generating means 37 and 38 cooperating with the first and second shutter speed selectors or dial 4 and lever 24 respectively for producing an electrical signal 102 with a magnitude proportional to the preselected shutter speed by dial 3 and an electrical signal 103 with a magnitude proportional to the preselected shutter speed by lever 24. A film sensitivity information signal generating means 54 cooperating with the dial 5 for producing an electrical signal 101 with a magnitude proportional to the sensitivity of the used full film has an output connected to an input of exposure operation and control circuit 33. These signal generating means 54, 37 and 38 may be formed with variable resistors, for example. 30 is a photosensitive element such as CdS cell, CdSe cell, or Silicon-Photo-Diode cell arranged to receive a portion the light entering through the objective lens L in the lens mount 11 after reflection from the pivotal reflex mirror 50, and 31 is a logarithmic converter having an input connected to the output of the photosensitive element 30 and having an output connected to an input of exposure operation and control circuit 33. In order to make a flash exposure with a specified shutter speed, for example, 1/60 second, there is provided shutter speed specifying means 32 such as a resistor having an output connected to an input of the logarithmic converter 31. The output of photosensitive element 30 is applied to logarithmic converter 31 under the action of an AND gate 41 only when the flash unit 12 is not used, while the output of the specifying means 32 is applied to the logarithmic converter 31 under the action of an AND gate 40 only when the flash unit 12 is rendered operative.

The exposure operation and control adapter unit 2 further includes diaphragm value signal generating means 55 for producing an electrical signal 105 with a magnitude proportional to the preset value of the lens aperture mechanism 29 when the diaphragm value signal transmitting arm 7 is attached to the exposure operation and control adapter unit 2 to transmit a signal representing the preset value from the lens aperture mechanism 29 to the exposure operation and control adapter unit 2 through the mechanical connection in the arm 7. The signal generating means 55 may be formed with a variable resistor. The output of the signal generating means 55 is applied to an input of exposure operation and control circuit 33 under the action of an AND gate 42 only when the dial 3 is set in the non-adjusting position for exposure in the diaphragm preselection automatic exposure range. 34 is a memory circuit for memorizing the output of exposure operation and control circuit 33. The output of the memory circuit 34 is applied to an input exposure operation and control circuit 33 under action of an AND gate 45 when the mirror-up signal 103 is generated in the camera body 1, or when the pivotal mirror 50 is moved from the viewing position to interrupt the light path to the photosensitive element 30. 35 is an elongation circuit for elongating the output of the exposure operation and control circuit 33 under the action of an AND gate 44 when the camera is switched to the diaphragm preselection exposure range and when a shutter speed is selected by lever 24. In other words, the elongation circuit 35 logarithmically elongates the shutter interval count termination control signal derived from the exposure operation and control circuit 33. In order to convert the diaphragm control signal 106 derived from the exposure operation and control circuit 33 when an exposure is made in the shutter preselection exposure range to a mechanical signal which is directed to the diaphragm value signal transmitting arm 7, there is provided diaphragm signal converting means constructed, for example, in the form of an electrical motor operatively connected to the arm 7. Interconnection terminals a',b',c',d',e',f' and g' are arranged for connection with interconnection terminals a, b, c, d, e, f and g of the camera body 1 respectively. Upon connection, the electrical signals can be transferred between the camera body 1 and the exposure operation and control adapter unit 2. 39 and 43 indicate OR gates, 104 and 107 nindicate diaphragm preselection setting signal and flash termination control signal respectively.

The flash unit 12 includes a trigger circuit 36 for producing a trigger signal by which a flash discharge tube 58 positioned behind the window 13 is actuated for energization, a photosensitive element 46 such as CdS cell, CdSe cell, or Silicon-Photo-Diode cell arranged to receive through the window 14 flash light reflected from an object being photographed with the flash illumination produced by the flash unit 12, and a power switch 57 which produces either an ON signal or an OFF signal, when the switch 57 is turned on or off respectively, and interconnection terminals l', m', n', o' and p' arranged for connection with the interconnection terminals l, m, n, o and p of the camera body 1 respectively. Upon connection of these terminals of the flash unit 12 with the respective terminals of the camera body 1, the electrical signals can be transferred between the flash unit 12 and the camera body 1. The flash unit 12 further includes three AND gates 47, 48 and 49.

In combining the exposure operation and control adapter unit 2 of the construction described with the camera body 1, the rails 23 of the exposure operation and control adapter unit 2 are first brought into engagement with the grooves 16 of the camera body 1, and then the exposure operation and control adapter unit 2 is slidingly moved to the most-advanced position where the interconnection terminals a' through g' are connected with the respective interconnection terminals a through g of the camera body 1. After this, the dial 3 of the exposure operation and control adapter unit 2 is turned until a clutch member not shown coaxially mounted on the dial 3 is brought into engagement with the pin 19 extending from the dial 18 of the camera body 1, thereby the dials 3 and 18 are fixedly secured with each other. Next, the diaphragm value signal transmitting arm 7 is mounted between the camera body 1 and exposure operation and control adapter unit 2, so that the diaphragm value signal can be transferred between the diaphragm value signal transmitting mechanism 27 of the camera body 1 and the diaphragm signal generating means 55 and diaphragm value signal converting means 56 of the exposure operation and control adapter unit 2. Next, the objective lens mount 11 is attached to the camera body 1, whereby the diaphragm presetting ring 9 is connected with the diaphragm value signal transmitting mechanism 27, while the automatic diaphragm operating mechanism 28 is connected with the lens aperture mechanism 29.

When the level of brightness of an object being photographed is so low as to require flash illumination, the flash unit 12 is attached to the camera body 1 at the mount 22, while the interconnection terminals l' through p' are brought into connection with the respective interconnection terminals l through p of the camera body 1, whereby the transmission of the electrical signals between the flash unit 12 and exposure operation and control adapter unit 2 is effected through the camera body 1.

The operation of the automatic exposure control system of FIG. 3 will next be explained in connection with three modes, namely, (I - i) the shutter preselection automatic daylight exposure control range; (I - ii) the diaphragm preselection automatic daylight exposure control range; and (I - iii) the automatic flash exposure range.

(I - i) Shutter preselection mode:

The film sensitivity selector dial 5 is turned to place a graduation representing the sensitivity of the used film in registry with index 6, thereby a signal 101 with a magnitude proportional to the selected film sensitivity (hereinafter abbreviated as signal "Sy") is applied to exposure operation and control circuit 33. Next, the diaphragm presetting ring 9 of the objective lens mount 11 is manipulated to place a symbol "E", (automatic diaphragm control) shown in FIG. 1 in registry with an index not shown. When the first shutter speed selector or dial 3 of exposure operation and control adapter unit 2 is set from its "F" position to its "B" position where the symbol "B" is in registry with index 4, the camera is switched from the diaphragm preselection automatic exposure range to the shutter preselection automatic exposure range. In the "B" position, a desired shutter speed which is slower than one second is selected by manipulation of the second shutter speed selector or lever 24, thereby the second shutter speed signal generating means 38 in the exposure operation and control adapter unit 2 produces a signal 103 with a magnitude proportional to the selected shutter speed (hereinafter abbreviated as "signal Tv2") which is then applied to exposure operation and control circuit 33. When dial 3 is further turned to place a shutter speed faster than one second in registry with index 4, the first shutter speed signal generating means 37 in exposure operation and control adapter unit 2 produces a signal 102 with a magnitude proportional to the selected shutter speed (hereinafter abbreviated as "signal Tv1") which is then applied to exposure operation and control circuit 33. At the same time, the signal Tv1 or Tv2 causes OR gate 39 to be turned on, and then causes AND gate 41 to be turned on, because OFF signal 113 is applied from flash unit 12 to AND gate 41 through a terminal p-p' connection, while AND gates 40 and 42 remain turned off, thereby the output of the photosensitive element 30 after compressed by the logarithmic converter 31 is permitted to enter central processing circuit 33. Responsive to these signals Sv, either Tv1 or Tv2, and the output of converter 31, central processing circuit 33 derives an exposure value representing an effective exposure aperture in the form of an electrical signal 106 which is then converted to a mechanical signal by the diaphragm value signal converting means 56 and which is simultaneously stored in the memory circuit 34. The mechanical signal serves as a diaphragm control signal 111 which is transmitted through the diaphragm value signal transmitting arm 7 and the diaphragm value signal transmitting mechanism 27 of the camera body to the lens aperture mechanism 29 of the lens mount 11.

When the shutter release button 20 is depressed, the automatic diaphragm operating mechanism 28 is rendered operative to adjust the lens aperture mechanism 29 to the predetermined setting, and the mirror 50 is moved from the viewing position to the non-viewing position, thereupon the signal generating means 51 produces a mirror-up signal 108 which is applied to AND gate 45 of exposure operation and control adapter unit 2 through a terminal b-b' connection. Responsive to signal 108 and the output of memory circuit 34, AND gate 45 is turned on, thereby the output of memory circuit 34 is applied to exposure operation and control circuit 33, although the light path to the photosensitive element 30 is interrupted as mirror 50 is pivoted upward. When mirror 50 has reached the non-viewing position, the shutter mechanism 26 is operated to initiate an exposure, and, at the same time, a count start control signal 109 is produced from the signal generating means 52, and is directed to exposure operation and control circuit 33 through a terminal c-c' connection. Upon advent of signal 109 on exposure operation and control circuit 33, exposure operation and control circuit 33 starts to count a time interval based on the signal Tv1 (102), or Tv2 (103). Upon termination of the counting, exposure operation and control circuit 33 produces a signal indicative of the count termination which is applied to AND gate 44. When the shutter speed is selected by lever 24, in other words, the selected shutter speed is slower than one second, or when the camera is set in the diaphragm preselection exposure range, AND gate 44 is turned on by application of the count termination signal thereto, and this count termination signal is transmitted through the elongation circuit 35 and a terminal a-a' connection to the shutter device 25 of the camera body 1. Based on this count termination signal, the control device 25 closes the shutter mechanism 26 to terminate the exposure.

When a shutter speed is selected by dial 3, the shutter control device 25 operates with dial 18 of camera body 1 in engagement with dial 3 to control operation of the shutter mechanism 25 in such a manner that after the shutter is opened by depression of shutter release button 20, the period of actuation of the shutter mechanism is controlled in accordance with the shutter speed selected by dials 3 and 18. In this case, OR gate 43 produces no output signal so that AND gate 44 remains in OFF state although exposure operation and control circuit 33 produces the count termination signal.

(I - ii) Diaphragm preselection mode:

The first shutter speed selector or dial 3 of exposure operation and control adapter unit 2 is turned to place symbol "F" in registry with index 4, thereby the camera is switched to the diaphragm preselection exposure range, and a signal 104 is applied to AND gate 42. When a desired diaphragm value is selected by diaphragm presetting ring 9 of lens mount 11, a mechanical signal 111 indicative of the selected diaphragm value is transmitted both to the automatic diaphragm operating mechanism 29 and to exposure operation and control adapter unit 2 through the signal transmitting mechanism 27 of the camera body 1 and the signal transmitting arm 7, and is converted into an electrical signal 105 with a magnitude proportional to the selected diaphragm value (hereinafter abbreviated as "signal Av") by the signal generating means 55 in exposure operation and control adapter unit 2. Upon advent of signal Av or 105 on AND gate 42, AND gate 42 is turned on, permitting signal Av or 105 to enter exposure operation and control circuit 33. Responsive to signal Av in addition to signals Sv or 101 and the output of photosensitive element 30 which are produced in a manner similar to that shown in connection with the shutter preselection mode, exposure operation and control circuit 33 derives an exposure value representing an effective exposure time in the form of an electrical signal which is then stored in the memory circuit 34.

When the shutter release button is depressed, the automatic diaphragm operating mechanism 28 is rendered operative to adjust the lens aperture mechanism 29 to the setting predetermined by diaphragm presetting ring 9, and mirror 50 is moved from the viewing position to the non-viewing position, thereupon the signal generating means 51 produces a mirror-up signal 108. Responsive to signal 108 and the output of memory circuit 34, AND gate 45 is turned on, thereby the output of memory circuit 34 is applied to exposure operation and control circuit 33, although the light path to photosensitive element 30 is interrupted as mirror 50 is pivoted upward. When mirror 50 has reached the non-viewing position, the shutter is opened to initiate an exposure, and, at the same time, exposure operation and control circuit 33 starts to count the time interval. Upon termination of the counting, exposure operation and control circuit 33 produces an output signal which then actuates the shutter control device 25 to close the shutter, thereby the exposure in the diaphragm preselection automatic exposure range is terminated.

(I - iii) Flash mode:

The dial 4 of exposure operation and control adapter unit 2 is turned to place symbol "F" in registry with index 4 as is in the diaphragm preselection mode, and the diaphragm presetting ring 9 is adjusted to a particular position suited for flash photography which is indicated at the light receiving window 14 of flash unit 12, thereby a signal Av or 105 is applied to exposure operation and control circuit 33 in a manner similar to that shown in connection with the diaphragm preselection mode. When the power switch 57 of flash unit 12 is turned on, the ON signal 112 is applied to AND gate 40 through a terminal o-o' connection. When AND gate 40 is turned on by signals 112 and 104, the shutter speed specifying means 32 is brought into cooperation with the logarithmic converter 31, while photosensitive element 30 being cut off from converter 31, so that a signal with a magnitude proportional to the specified shutter speed for flash photography, for example, 1/60 second is applied to exposure operation and control circuit 33.

When the release button 20 is depressed, the lens aperture mechanism 29 is adjusted to the predetermined setting, and the shutter is opened in synchronism with the upward movement of mirror 50, thereupon the counting of the shutter interval is initiated. As mirror 50 is moved upward, the signal generating means 53 generates an energization start control signal 110 which is then applied to AND gate 47 through a terminal l-l' connection. When AND gate 47 is turned on by signals 110 and 112, the trigger circuit 36 is rendered operative to energize the flash discharge tube 58. Light reflected from the object being photographed with the flash illumination is received through window 14 by photosensitive element 46, and the output of element 46 is applied to exposure operation and control circuit 33 through AND gates 48 and 49 and terminal n-n' and e-e' connections, as AND gate 48 is turned on by signals from discharge tube 58 and element 46, and AND gate 49 is turned on by signals from AND gate 48 and power switch 57.

Responsive to signals Sv and Av and the output signals of means 32 and element 46, exposure operation and control circuit 33 derives a flash exposure value representing a correct flash lighting condition. When the amount of flash light energy as sensed by photosensitive element 46 has reached a level corresponding to the correct flash lighting condition, the flash discharge tube 58 is deenergized by a signal 107 from the exposure operation and control circuit 33, as signal 107 is transmitted through terminal d-d' and m-m' connections to discharge tube 58. After that, exposure operation and control device produces the count termination signal by which the shutter 26 is closed to terminate the exposure in the flash mode.

Referring now to FIG. 4, there is shown a practical example of construction arrangement and connection of the essential parts of the automatic exposure control system of FIG. 3 with the camera body 1, exposure operation and control adapter unit 2, objective lens mount 11 and flash unit 12, wherein the devices, mechanisms, means and elements having similar constructions and functions to those of the parts shown in FIGS. 1 through 3 are denoted by the same reference numerals and characters.

In camera body 1, a mechanical shutter control mechanism 250 cooperating with the first shutter speed selector or dial 18 comprises a cam follower lever 212 having a projection 252a which serves as a cam follower pin for a cam disk 181 coaxially mounted on dial 18 and which is biased by a spring 251 in a counter-clockwise direction about a pivot pin 253 to urge the cam follower projection 252a for normally abutting engagement with the camming surface of cam disk 181, and a sector gear lever 255 which is biased by a spring 256 in a counter-clockwise direction about a pivot pin 257 to urge a pin 254 mounted on lever 255 at one end for normal abutment on the tail 252b of cam follower lever 252, the opposite end of which has a cogged portion 255a engaging a pinion 258 rotatable about a shaft 259. The pinion 258 engages a gear 260 rotatable about a common shaft 262 of an escapement gear 261 fixedly secured to gear 260. The escapement gear 261 cooperates with an anchor 263 pivotally mounted on a pin 264.

The shutter mechanisms 26 is constructed in the form of a two-curtain type focal plane shutter known in the art comprising a front curtain 265 with a drive spring 267, and a rear curtain 266 with a drive spring 268. A latching member for front curtain 265 is constructed in the form of a pawl lever 271 pivoted at pin 272 and having a pawl which serves to latch front curtain 265 against the force of spring 267 when the shutter is in the cocked position, as pawl lever 271 is biased by a spring 273 in a counter-clockwise direction about a pin 272. The front curtain latching member is mechanically linked to the release button 20 as indicated by dashed lines. A latching member for the rear curtain 266 is constructed in the form of a lever 274 cooperating with an electromagnet 297 and which is biased by a spring 276 in a clockwise direction about a pin 275 to tend the pawl of lever 274 for disengagement from a projection 266a of the support member of rear curtain 266. So long as the solenoid of electromagnet 297 is energized, rear curtain 266 is latched in the cocked position. The rear curtain support member is further provided with a camming surface 266b to slidingly engage with the pin 254 of sector gear lever 255, when the rear curtain runs down from the latched position. 278 indicates a film gate.

The count start control signal generating means 52 is constructed in the form of a normally closed switch S2 arranged so that when the shutter is in the cocked position, it is closed by a pin 269 extending from the front curtain support member and when the front curtain runs down it is opened to produce a count start control signal 109. The flash start control signal generating means 53 for flash unit 12 is constructed in the form of a normally open switch S3 arranged so that when the shutter is in the cocked position it is opened and when the front curtain 265 runs down to a position near the fully opened position, it is closed by the projection 265a of the front curtain support member to produce a flash start control signal 110. The mirror-up signal generating means 51 is constructed in the form of a normally open switch S1 arranged so that when mirror 50 pivoted at a shaft 501 is in the viewing position it is opened and when mirror 50 is pivoted upward and the non-viewing position, it is closed by engagement with mirror support member not shown.

The diaphragm value signal transmitting mechanism 27 comprises a slide 279 having two longitudinally elongated slots 279b in which are engaged respective pins 280 fixedly mounted on the camera housing, and having a projection 279a engaging with an arm 9a extending from the diaphragm presetting ring 9 of lens mount 11. The automatic diaphragm operating mechanism 28 comprises a lever 281 pivoted at a shaft 282 and having a rectangularly bent portion 281a engageable with an arm 129a extending from an automatic diaphragm ring 129 provided in the lens aperture mechanism 29. Character L indicates an objective lens system.

In order to switch the camera between the daylight and flash exposure ranges, there is provided a switch S4 having two fixed contacts 289 and 290 and a single movable contact 291 extending into a space between two pins 284 and 285 fixedly mounted on one arm of a two-armed lever 283, of which the other arm extends into the space which is occupied by a portion of flash unit 12 when flash unit 12 is attached to the flash unit mount 22, so that when flash unit 12 is mounted on the camera body 1 at mount 22, the lever 283 is turned in a counter-clockwise direction about a pin 287 against the force of a spring 286, thereby the movable contact 291 is taken out of contact with fixed contact 290 and instead is brought into contact with the other fixed contact 289.

The camera body 1 is further provided with eleven terminals T1 through T11 for electrical connection to exposure operation and control adapter unit 2, and with three terminals T12, T13 and T14 for electrical connection to flash unit 12, the switch S1 being connected between terminals T1 and T2, the switch S2 between terminals T3 and T4, the solenoid of electromagnet 277 between terminals T5 and T6, the fixed contact 289 of switch S4 to terminal T7, the movable contact 291 of switch S4 to terminal T8, the fixed contact 290 of switch S4 to a terminal T9, the fixed contact of switch S3 to a terminal T12, and further a terminal T10 being directly connected to a terminal T11, and a terminal T11 being directly connected to a terminal T13.

Explanation will next be given to the various parts of exposure operation and control adapter unit 2. The film speed information signal generating means 54 is constructed in the form of a variable resistor VR1 cooperating with selector dial 5 and comprising an arcuate resistor member 541 and an arcuate conductor member 542 arranged in concentric relation with each other and to dial 5 on which ride respective sliders 543 and 544 fixedly carried on an arm 5a radially extending from dial 5, the resistor and conductor members 541 and 542 being connected to exposure operation and control circuit 33' to provide continuously varying resistance values as dial 5 is turned. It is to be noted that the exposure operation and control circuit 33' includes circuit blocks 31, 33, 34 and 35 of FIG. 3. The exposure operation and control circuit 33' is connected to a battery E1 through a switch S6, and has a timing condenser C1 connected thereto.

The first shutter speed signal generating means 37 is constructed in the form of a variable resistor VR2 cooperating with the first selector dial 3 and comprising an arcuate resistor member 371 with a conductor portion 371a positioned at one end thereof, an arcuate conductor member 372 arranged in concentric relation with each other and to dial 3 on which ride respective sliders 373 and 374 fixedly carried on an arm 3a radially extending from dial 3, the resistor and conductor members 371 and 372 being connected to exposure operation and control circuit 33' to provide a range of different resistance values as dial 3 is turned, and to provide a zero resistance value when dial 3 is set in either of the positions "B" and "F" where the slider 373 rides on the conductor portion 371a.

The second shutter speed signal generating means 38 is constructed in the form of a variable resistor VR3 cooperating with lever 24 and comprising an arcuate resistor member 381 and an arcuate conductor member 382 arranged in concentric relation to each other and to the disk 241 associated with lever 24. The disk 241 has a radially extending arm 241 provided with sliders 383 and 384 arranged to ride on the resistor and conductor members 381 and 382 respectively which are connected to exposure operation and control circuit 33' so that a range of different resistance values beyond the range of variable resistor VR2 is produced as lever 24 with disk 241 is turned. A switch S5 is positioned adjacent dial 3, so that when dial 3 is turned to place symbol "F" in registry with index 4, or when the camera is switched to the diaphragm preselection automatic exposure range, it is closed by a projection 3b of dial 3 to produce a diaphragm preselection indicating signal 104. The switch S5 has a fixed contact and a movable contact connected to exposure operation and control circuit 33'.

The diaphragm value signal generating means 55 cooperative with the diaphragm signal transmitting arm 7 for producing an electrical diaphragm value signal 105 is constructed in the form of a variable resistor VR4 which comprises a linear resistor member 551 and a linear conductor member 552 arranged in parallel relation with each other on which ride respective sliders 553 and 554 fixedly carried on a projection 555a of a slide 555 having two longitudinally elongated slots 555b in which are engaged respective pins 556 fixedly mounted on the camera housing to permit sliding movement of slide 555 along a line parallel to the resistor and conducting members 551 and 552. The slide 555 has a racked portion 555c engaging a gear 151 constituting part of a gear train 151, 152, 153 and 154 through which the motion of slide 555 is transmitted to a slide 7 having a racked portion 7c engaging the gear 151 of the gear train. The slide 7 constitutes the essential part of the arm 7. The slide 7 has two longitudinally elongated slots 7b in which are engaged pins 71 fixedly mounted on the camera housing, and has a projection 7a engaging a projection 279c of slide 279 provided in the camera body. The transmission of the diaphragm value signal between the camera body 1 and exposure operation and control adapter unit 2 is effected by the projection 7a and projection 279c connection.

The diaphragm value signal converting means 56 for converting an electrical signal 106 derived from exposure control and operation circuit 33' to a corresponding mechanical signal is constructed in the form of an electrical motor 56 of which the winding is connected to exposure operation and control circuit 33' in combination with an electromagnetic type clutch mechanism 157 connected to the output shaft of motor 56 and of which operation is controlled by the output of exposure operation and control circuit 33', and a reduction gearing mechanism 156 connected to the clutch mechanism 157 and having an output shaft on which a gear 155 engaging with one gear 152 of the gear train is fixedly mounted.

The photosensitive element 30 is positioned adjacent the exit face of a penta-prism constituting part of a view finder of the camera, and is connected between exposure operation and control circuit 33' and a terminal T9. On the other hand, a fixed resistor R1 which serves as the shutter speed specifying means 32 is connected between exposure operation and control circuit 33' and a terminal T'7. Therefore, the selection of photosensitive element 30 and resistor R1 for connection to exposure operation and control circuit 33' is effected in somewhat different manner from that shown in connection with FIG. 3, where such selection depends upon whether it is produced the ON signal or the OFF signal which is produced in response to closing or opening operation of the power switch 57 of flash unit 12 respectively. In the example of FIG. 4, however, the selection of the photosensitive element 30 and resistor R1 for connection to exposure operation and control circuit 33' depends upon whether or not the flash unit 12 is mounted on the camera body 1 at the mount 22. When flash unit 12 is not mounted on camera body 1, photosensitive element 30 is connected through a terminal T'9-T9 connection, a contact 290-291 connection of switch S4 and a terminal T8-T'8 connection to exposure operation and control circuit 33', while when flash unit 12 is mounted on camera body 1, photosensitive element 30 is cut off from exposure operation and control circuit 33' and instead resistor R1 is brought into connection to exposure operation and control circuit 33' through a terminal T'7-T7 connection, a contact 289-291 connection of switch S4 and a terminal T8-T'8 connection.

In a flash unit 12, there is provided a booster circuit 121 having two input terminals between which a battery E is connected through a power switch S7 and having two output terminals between which a main condenser C3 is connected to be charged to a voltage increased by the booster circuit 21. Across condenser C3 is a flash discharge tube 58 and a first thyrister SCR1 connected in series with each other, the control gate of thyrister SCR1 being connected to a trigger circuit 36, so that upon advent of a trigger signal, thyrister SCR1 is turned on to energize discharge tube 58. Another thyrister SCR2 of which the control gate is connected to the output of exposure operation and control circuit 33 is connected across the first thyrister SCR1 through a condenser C2 which serves to turn off thyrister SCR1 when SCR2 is turned on. Two resistors R2 and R3 are connected in series to condenser C2 and to condenser C3 to charge condenser C2 to a predetermined voltage. The flash unit 12 is further provided with three terminals T'12, T'13 and T'14 for connection to terminals T12, T13 and T14 of camera body 1, therminal T'12 being connected to trigger circuit 36, terminal T'13 to the control gate of second thyrister SCR2 and terminal T'14 to photosensitive element 46.

Figure 4A:
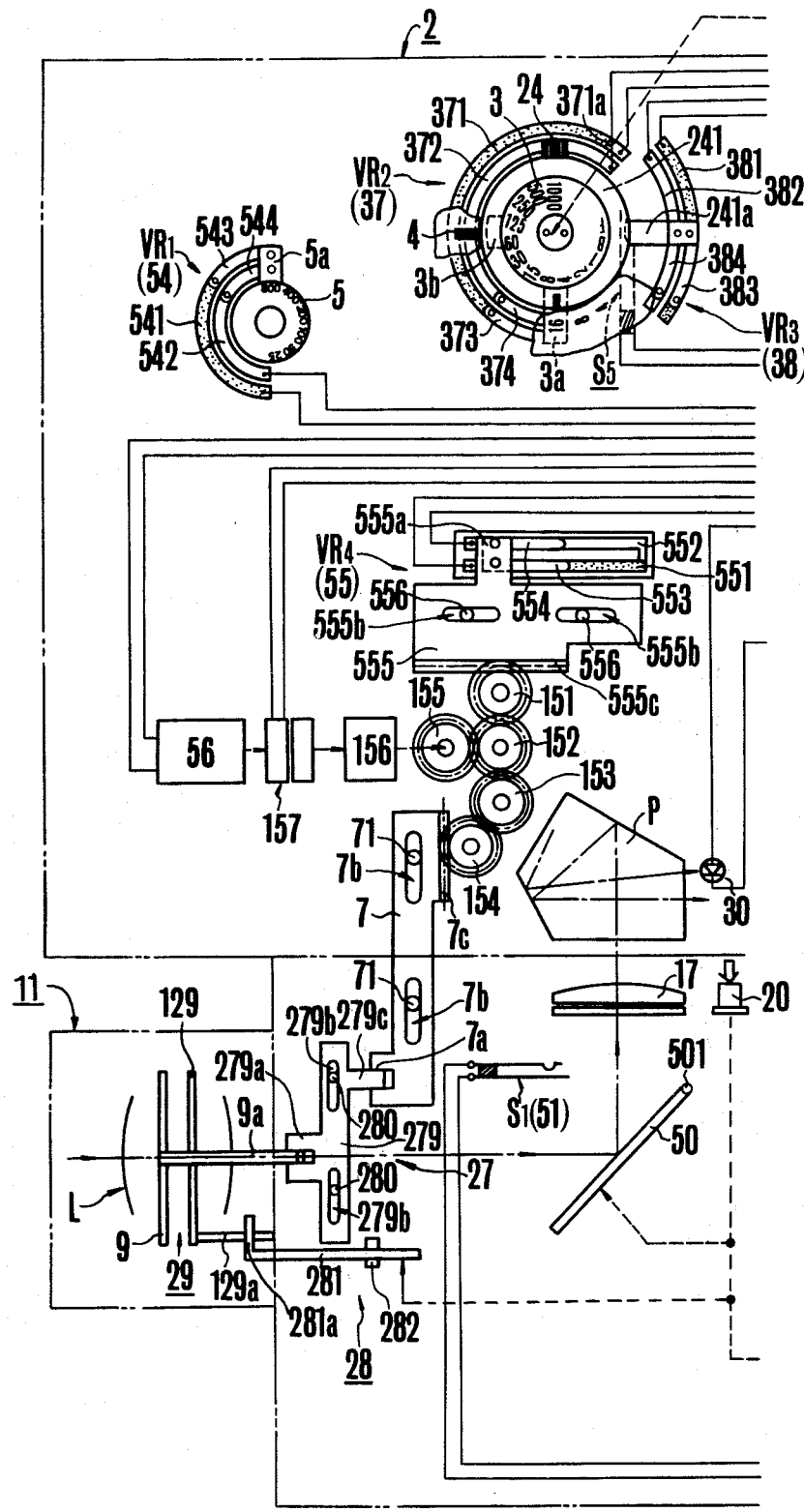
FIGS. 4a, 4b and 4c are a schematic view, partly in block form, of one example of the construction, arrangement and circuitry of the essential parts of the exposure operation and control adapter unit, camera body, objective lens mount and flash unit according to the embodiments of FIGS. 2 and 3.
Figure 4B:
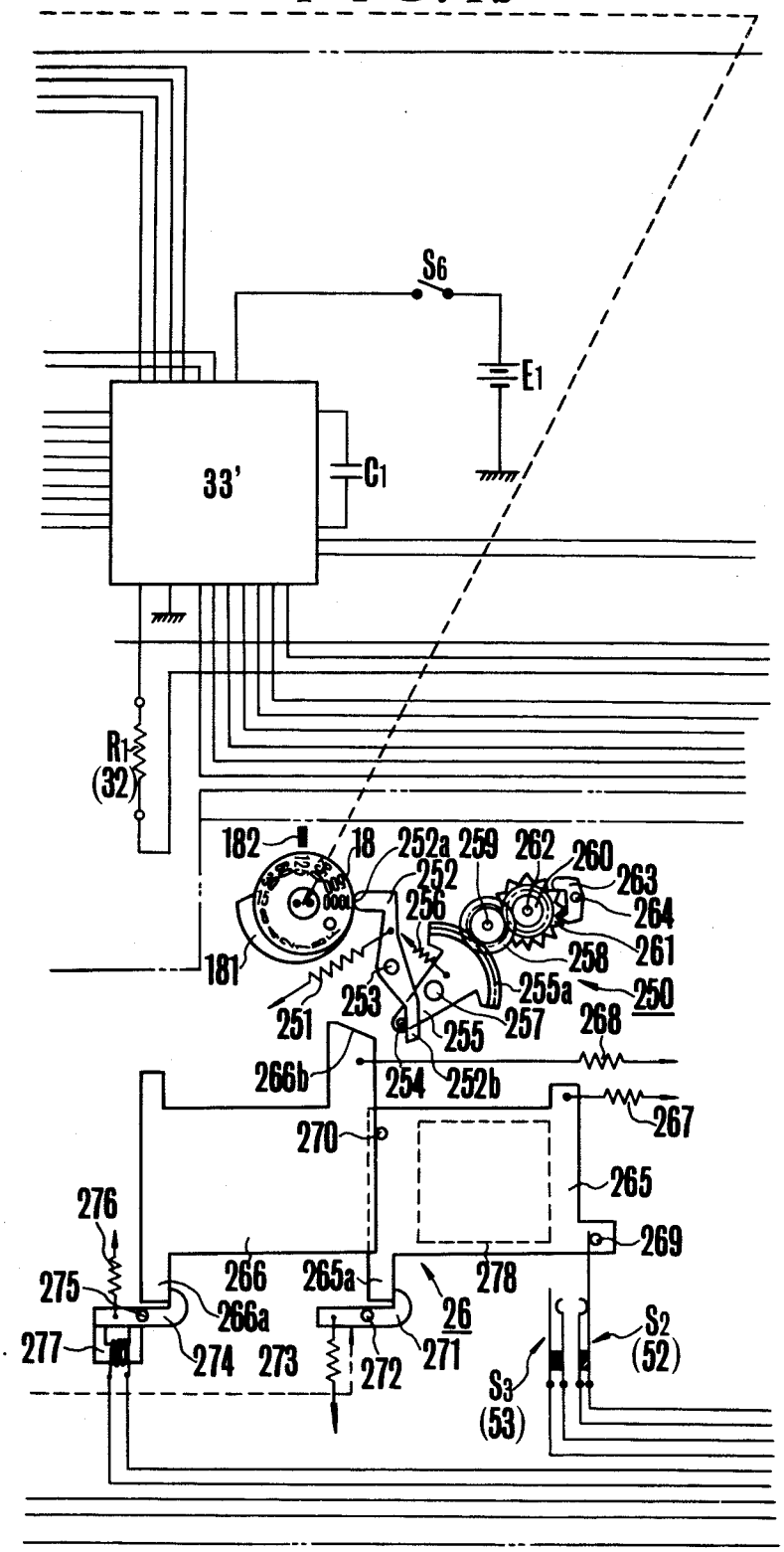
Figure 4C:
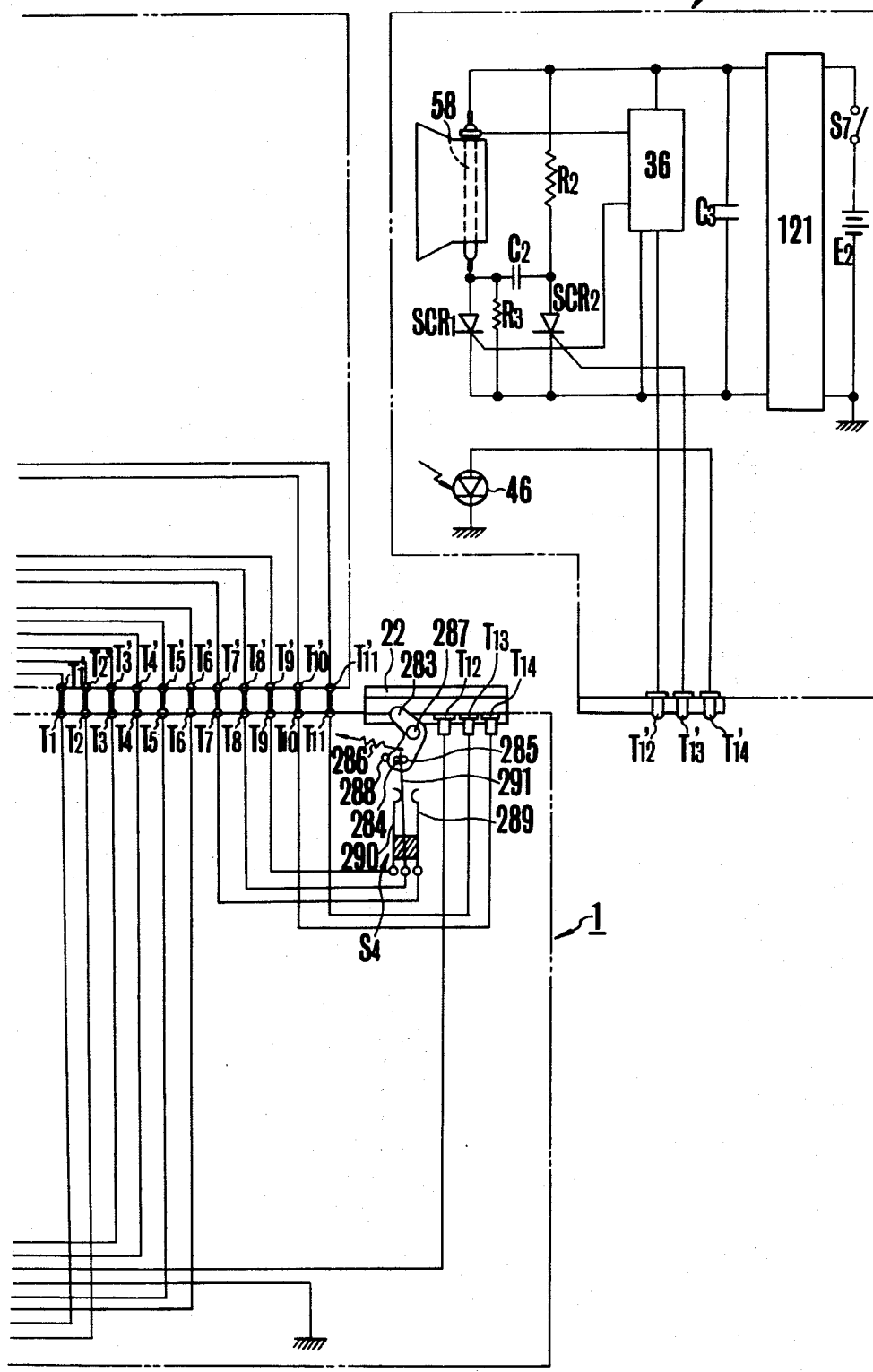

FIG. 4d is a circuit diagram showing the details of the exposure operation and control circuit 33' of FIG. 4. At first, the construction and arrangements of various components thereof will be explained. In the figure, the same reference characters as those of FIGS. 4a, 4b and 4c are employed to denote the similar parts.

AM is an amplifier selectively responsive to outputs of a photocell 30 and a resistor R1 for producing an output with a magnitude proportional to the logarithm of a light value or resistacne value respectively, having an input terminal connected both to one pole of the photocell 30 and to one end of the resistor R1, the opposite pole and end of which are connected to respective fixed contacts T'9 (T9–290) and T'7 (T7–289) of a circuit-transfer switch S4 having a common movable contact 291 connected through an interconnection terminal T'8 (T8) to the other input terminal of the amplifier AM. By switching S4, the amplifier AM is rendered cooperative with either of the photocell 30 and resistor R1 depending upon whether daylight or flash exposure is made. The output of the amplifier AM in cooperation with the photocell 30 will be hereinafter referred to as object brightness information Bv.

OA1 is an operational amplifier for performing exposure operation and control having one input terminal connected both to the output terminal of the amplifier AM through a resistor Rg and to a variable resistor VR1, and having another input terminal connectable to either a variable resistor VR2, or VR3, or VR4, the selection of which is dependent upon which of the two exposure control modes is rendered effective. When either of the variable resistors VR2 and VR3 is selected, the operational amplifier OA1 is rendered responsive to a signal Tv1 or Tv2 from the variable resistor VR2 or VR3 respectively, a signal Sv from the variable resistor VR1, and an output Bv of the amplifier AM to produce an output representing an effective aperture based on the exposure operation and control (defined by the formula Sv + Bv — Tv1 or Tv2). On the other hand, when the variable resistor VR4 is selected, the operational amplifier OA1 is rendered responsive to a signal Av from the variable resistor VR4 and the signals Sv and Bv to produce an output representing an effective exposure time based on the exposure operation and control (defined by the formula Sv + Bv — Av).

C4 is a storage condenser normally connected to the output terminal of the operational amplifier OA1 for storing the exposure operation and control result until the reflex mirror 50 is moved to its non-viewing position where the storage condenser C4 is disconnected from the operational amplifier OA1.

OA2 is an operational amplifier having two input terminals, one of which is connected to the variable resistor VR4 cooperative with the diaphragm device 29, and the other of which is connected both to the output terminal of the operational amplifier OA1 and to the storage condenser C4 only when the shutter preselection exposure control mode is effective. As the size of diaphragm aperture is varied, the operational amplifier OA2 produces ever-varying outputs of a polarity and magnitudes corresponding respectively to the direction and amounts of deviation of ever-varying resistance values of the variable resistor VR4 pre-set by the diaphragm device 29 from the effective aperture value determined by the operational amplifier OA1. The output of the operational OA2 becomes zero when the aperture preset in the diaphragm device 29 is brought into coincidence with the effective aperture value determined by the operational amplifier OA1.

332 is a clutch control circuit responsive to the output of the operational amplifier OA2 for controlling the period of actuation of a clutch 157. The clutch control circuit 332 is connected to the operational amplifier OA2 only when the shutter preselection mode is effective, so that the clutch 157 is maintained in its operative position until the operational amplifier OA2 produces the "0 (zero)" signal. Upon occurrence of the "0" signal, the clutch 157 is brought into the inoperative position.

333 is a motor control circuit connectable to the operational amplifier OA2 only when the shutter preselection mode is effective and responsive to the polarity of the output of the operational amplifier OA2 for controlling the direction of rotation of a motor 56 in a manner to decrease the magnitude of deviation of the pre-set aperture value from the exposure operation and controlled effective aperture value. When a "0" signal appears at the output terminal of the operational amplifier OA2, the motor control circuit 333 stops the motor 56 from rotation.

B1 and B2 are buffer circuits, the buffer circuit B1 having a single input terminal connectable to both the output terminal of the operational amplifier OA1 and the storage condenser C4 only when the shutter preselection mode and the flash exposures control mode are effective, and the buffer circuit B2 having a single input terminal selectively connectable to either of the variable resistors VR2 and VR3.

331 is a magnet control circuit selective responsible to the outputs of the buffer circuits B1 and B2 for controlling ON-OFF operation of an electromagnet 277 connected through interconnection terminals T'6–T6 to the output of the magnet control circuit 331. When the diaphragm preselection mode and the flash exposure mode are effective, the input terminal of the magnet control circuit 331 is connected to the output terminal of the buffer circuit B1. When the shutter preselection mode with a longer exposure time range is rendered effective by the manipulation of a lever 24, the input terminal of the magnet control circuit 331 is connected to the output terminal of the buffer circuit B2.

OA3 is an operational amplifier operative when in the flash exposure control mode for deriving a correct flash light energy level for a flash device 12 (more particularly, a discharge tube 59) and having two input terminals, one of which is connected to the variable resistors VR1 and VR4, and the other of which is connected through interconnection terminals T'10–T10 and T14–T'14 to a photosensitive element 46 provided in the flash device 12. The output terminal of the operational amplifier OA3 is connected through interconnection terminals T'11–T11 and T13–T'13 to a flash-terminating circuit 361 of the flash device 12. When the amount of flash energy produced from the discharge tube 58 has reached the correct flash energy level dependent upon the signal Sv from the variable resistor VR1, the signal Av from the variable resistor VR4, and the output of the photosensitive element 46, the operational amplifier OA3 produces a signal of predetermined level which is applied to the flash-terminating circuit 361.

The flash-terminating circuit 361 includes the thyristor SCR2, condenser C2 and resistors R2 and R3 of FIG. 4, and has an output terminal connected to a trigger circuit 36. Upon occurrence of the signal from the operational amplifier OA3, the flash-terminating circuit 361 terminates the duration of actuation of the trigger circuit 36 to deenergize the discharge tube 58.

Rh is a resistor connected between a point of connection between the variable resistor VR1 and the input terminal of the operational amplifier OA3 and a point of connection between the variable resistor VR4 and the input terminal of the operational amplifier OA2 to prevent the signal Sv from being applied from the variable resistor VR1 to the operational amplifier OA2.

GS1 is a gate switch for selecting either of the variable resistors VR2 and VR3 for connection with the input terminal of the operational amplifier OA1. The gate switch GS1 has two fixed contacts (a) and (b) connected respectively to the variable resistors VR2 and VR3, and has a movable contact (c) connected to the input terminal of the operational amplifier OA1. So long as the shutter preselection mode with a shorter exposure time range is effective, the movable contact (c) remains in contact with the fixed contact (a). When the shutter speed is set in the longer exposure time range, the movable contact (c) of the gate switch GS1 is moved to the fixed contact (b) under the action of the relay L1. The movable contact (c) of the gate switch GS1 is also connected to the output terminal of the buffer circuit B2.

GS3 is a gate switch for selecting either of the gate switch GS1 and the variable resistor VR4 for connection with the input terminal of the operational amplifier OA1. The gate switch GS3 has two fixed contacts (a) and (b) connected respectively to the movable contact of the gate switch GS1 and the variable resistor VR4, and has a movable contact (c) connected to the input terminal of the operational amplifier OA1. When the shutter preselection mode is effective, the movable contact (c) is in contact with the fixed contact (a). When the diaphragm preselection mode or the flash mode is rendered effective, the movable contact (c) is brought into contact with the fixed contact (b) under the action of a relay L3.

GS4 is a gate switch for selecting either of the buffer circuits B1 and B2 for cooperation with the magnet control circuit 331. The gate switch GS4 has two fixed contacts (a) and (b) connected respectively to the output terminals of the buffer circuits B2 and B1, and has a movable contact (c) connected through a diode D8 and a gate switch GS2 to the input terminal of the magnet control circuit 331. When the shutter preselection mode is effective, the movable contact (c) is in contact with the fixed contact (a). When the shutter preselection mode is replaced by the diaphragm preselection mode or the flash mode, the movable contact (c) is moved to the fixed contact (b) under the action of a relay L4.

The gate switch GS2 is opened when the shutter preselection mode operates in the shorter exposure time range and thereby, the magnet control circuit 331 is cut off from its input signal. When the shutter preselection mode is rendered operative in the longer exposure time range, or when the diaphragm selection mode or the flash mode is rendered operative, the gate switch GS2 is closed under the action of relay L2, thereby the magnet control circuit 331 is rendered receptive of the input signal.

The diode D8 has a function of logarithmic extension. Connected to a point of connection between the diode D8 and the gate switch GS2 is one pole of a timing condenser C1. The above mentioned count-starting switch S2 has one terminal connected through interconnection terminals T'3–T3 to a point of connection between the diode D8 and the timing condenser C1, and has the opposite terminal connected through interconnection terminals T'4–T4 to the negative terminal of an electric power source E1.

GS7 is a gate switch connected between the output terminal of the operational amplifier OA1 and the storage condenser C4 and arranged to be open when the mirror 50 is in its viewing position, where the output of operational amplifier OA1 is applied to storage condenser C4, and to be closed under the action of a relay L7 when the upward movement of the mirror 50 is initiated to thereby prevent the application of the output of operational amplifier OA1 to condenser C4.

GS5 is a gate switch for selecting either of the operational amplifier OA2 and buffer circuit B1 for cooperation with operational amplifier OA1 depending upon which of the modes is effective. The gate switch GS5 has two fixed contacts (a) and (b) connected respectively to the input terminals of operational amplifier OA1 and buffer circuit B1, and has a movable contact (c) connected to both of the storage condenser C4 and gate switch GS7. When the shutter preselection mode is operative, the movable contact (c) is in contact with the fixed contact (a). When the diaphragm preselection mode or the flash mode is rendered operative, the movable contact (c) is brought into contact with the fixed contact (b) under the action of a relay L5.

GS6 is a gate switch connected between the output terminal of operational amplifier OA2 and the input terminals of control circuits 332 and 333 and arranged to be closed when the shutter preselection mode is operative to thereby apply the output of operational amplifier OA2 to the control circuits 332 and 333, and to be opened under the action of a relay L6 when either the diaphragm preselection mode, or the flash mode is operative to thereby cut off both control circuits 332 and 333 from the operational amplifier OA2.

The above-described relays L1 and L7 are connected between a common positive bus connected through a power switch S6 to the positive terminal of a battery E1 and respective switching transistors Tr1 to Tr7 at their collector electrodes and are arranged to control operations of the respective gate switches GS1 to GS7 as the transistors Tr1 to Tr7 are driven for switching operations individually or in combination, as will be seen from the description below.

The switching transistors Tr1 and Tr2 have respective emitters connected to the negative terminal of battery E1 and have respective bases connected both to the negative terminal of battery E1 through a common resistor Rb and to the conductive member 372 of the variable resistor VR2 through a common resistor Ra. The variable resistor VR2 has a resistance member 371 provided with a conductive portion formed therein connected to the power switch S6. In this arrangement, with the power switch S6 being closed, when the dial 4 is operated to place its symbol "B" or "F" in registry with the index 4, the slider 373 is brought into contact with the conductive portion 371a in the resistance member 371, thereby transistors Tr1 and Tr2 are turned "on" to energize relays L1 and L2. The energization of relay L1 causes the movable contact (c) of gate switch GS1 to be displaced from the fixed contact (a) to (b), while the energization of relay L2 causes movement of gate switch GS2 from its open state to its closed state.

The switching transistors Tr3 to Tr6 have respective emitters connected to the negative terminal of battery E1 and have respective bases connected both to the negative terminal of battery E1 through a common resistor Rc and to a switch through a common resistor Rc. This switch S5 is connected to the power switch S6. In this arrangement, with switch S6 being closed, when the dial 3 is operated to place its symbol "F" in registry with index 4, the switch S5 is closed, thereby transistors Tr3 to Tr6 are turned on to energize relays L3 to L6. The energization of relays L3 to L5 causes movements of their respective gate switches GS3 to GS5 from their positions (a) to their positions (b), while the energization of relay L6 causes movement of its gate switch GS6 from the closed position to the open position.

The switching transistor Tr7 has an emitter connected to the negative terminal of battery E1 and has a base connected both to the negative terminal of battery E1 through a resistor Rf and to one terminal of a switch S1 through a resistor Re and interconnection terminals T'1–T1, the opposite terminal of switch S1 being connected to switch S6 through interconnection terminals T'2–T2. When switch S1 is closed in almost exact synchronism with the initiation of upward movement of the mirror 50, transistor Tr7 is turned on to energize relay L7, thereby gate switch GS7 is moved from its closed position to its open position.

D1 to D7 are diodes connected in parallel with respective relays L1 to L7.

Operations of the various parts of the apparatus of FIG. 4 will next be described in connection with three modes, namely, (II-i) the shutter preselection automatic daylight exposure range; (II-ii) the diaphragm preselection automatic daylight exposure range and (II-iii) the automatic flash exposure range, related to those shown in FIG. 3.

(II-i) Shutter preselection mode:

At first, the power switch S6 for exposure operation and control circuit 33' is closed, and dial 5 is turned to select the sensitivity of the used film, thereby the variable resistor VR1 provides a resistance value corresponding to selected film sensitivity as signal Sv or 101 (see FIG. 3). On the other hand, the diaphragm presetting ring 9 is turned to place its symbol "E" (see FIG. 1) in registry with an index not shown, and then the dial 3 of exposure operation and control adapter unit 2 is moved from the position "F" to switch the camera to the shutter preselection automatic exposure range in which an exposure may be made either with a shutter time selected from the range of shutter times shorter than one second, or with a shutter time selected from the range of shutter times longer than one second.

(A) Shorter shutter time range:

The dial 3 is turned to place a desired graduation or symbol other than "B" in registry with index 4, causing variable resistor VR2 cooperating with dial 3 to provide a resistance value as signal Tv1 or 102 (see FIG. 3), and simultaneously causing the dial 18 of camera body 1 to be turned through the dial 3 and pin 19 connection, so that the position of the shutter control mechanism 250 is adjusted in conformance with the selected shutter time as the cam disk 181 is rotated to turn the cam follower lever 252 about pin 253 and sector gear 255 about shaft 257 to a position which is a factor of controlling the retarding movement of the rear curtain of the shutter 26. Light entering through the objective lens L is reflected to the condenser lens 17 and penta-prism P, and therefrom directed to the exit face thereof. A portion of the light emanating from the exit face of penta-prism P impinges on the light receiving surface of photosensitive element 30 which in turn produces an output in the form of a voltage proportional to the level of brightness of the object being photographed.

Responsive to signals Sv and Tv1 and the output of element 30, exposure operation and control circuit 33' derives an exposure value representing an effective exposure aperture and simultaneously actuates the electromagnetic type clutch mechanism 157 thereby the motion of motor 56 is transmitted through the gear train 151 through 154, slide 7 and slide 279 to the diaphragm presetting ring 9 of lens mount 11. As motor 56 is rotated by the output from exposure operation and control circuit 33', slide 555 is moved while varying the resistance value of variable resistor VR4 which is detected by exposure operation and control circuit 33'. When the resistance value of variable resistor VR4 has reached a value proportional to the derived exposure value, exposure operation and control circuit 33' produces a control signal which is directed to the clutch mechanism 157, thereby the clutch mechanism 157 is rendered inoperative to terminate the transmission of motion of motor 56 to the diaphragm presetting ring 9. At this time, the lens aperture mechanism 29 assumes a preset operative position determined by the exposure operation and control circuit 33'. Motor 56 is stopped from rotation in synchronism with the advent of the control signal on the clutch mechanism 157.

When release button 20 is depressed to the first step, mirror 50 is pivoted upward about shaft 501 to the nonviewing position, and simultaneously the automatic diaphragm operating lever 281 is turned about pin 282. Such turning movement of lever 281 causes a rotative movement of automatic diaphragm ring 129 which in turn adjusts the size of the aperture defined by the lens aperture mechanism 29 from the maximum possible size to the exposure value. Switch S1 is closed in synchronism with the pivoting movement of mirror 50 causing the derived exposure value to be memorized for the purpose of performing the automatic diaphragm setting operation despite the fact that the upward movement of mirror 50 interrupts the light path to the photosensitive element 30.

Upon further depression of release button 20 to the second step, the front curtain 265 is released from the latched position or from front curtain latching lever 271, and begins to run down to the fully opened position under the action of drive spring 267. Since the solenoid of electromagnet 277 is not energized, the rear curtain 266 begins to run down in engagement with a pin 270 fixedly mounted on the front curtain support member to a position where although film gate 278 is fully opened, the tapped or camming surface 266b of the rear curtain support member is brought into engagement with pin 254 fixedly mounted on the sector gear 255, thereby the running down movement of the rear curtain 266 is retarded by a time interval determined by the shutter control mechanism 250 to realize the selected shutter time. Upon termination of duration of the time interval, the rear curtain 266 is disengaged from the pin 254, being permitted to run down under the action of drive spring 268, thereby the film gate 278 is fully blocked to terminate the exposure.

(B) longer shutter time range:

The dial 3 is turned to place its symbol "B" in registry with index 4 and then lever 24 is turned to select a desired shutter time longer than one second, thereby the variable resistor VR2 provides no resistance value, or no signal Tv1 or 102 because the slider 373 for the resistor member 371 is located on the conductor portion 271a thereof, and instead variable resistor VR3 provides a resistance value as signal Tv2 or 103 (see FIG. 3). At the same time, the lift of the cam disk 181 at a location where the cam follower projection 252a of lever 252 engages with the camming surface of cam disk 181 reaches the maximum possible level which in turn causes the pin 254 of sector gear 255 to be moved away from the path of movement of the camming surface 266b of the rear curtain support member. As a result, the shutter control mechanism 250 is rendered inoperative with respect to the rear curtain 266. On the other hand, exposure operation and control circuit 33' energizes the solenoid of electromagnet 277 in response to the setting of variable resistor VR2 to the zero resistance position, thereby the rear curtain 266 is latched by pawl lever 274 in the cocked position against the force of spring 276.

Responsive to signals Sv and Tv2 and the output of element 30, exposure operation and control circuit 33' derives an exposure value representing an effective exposure aperture. Based on this exposure value, the lends aperture mechanism 29 is preset by the help of motor 56 in a manner similar to that shown in connection with the exposure control operation in the shorter shutter time range.

When release button 20 is depressed to the first step, switch S1 produces a mirror-up signal 108 in synchronism with the pivoting movement of mirror 50, and the automatic diaphragm operating mechanism 28 is operated to adjust the size of the aperture of the lens aperture mechanism 29 from the maximum possible size to the derived exposure value. Upon further depression of release button 20 to the second step, the front curtain 265 is disengaged from the latch lever 271 to run down to the fully opened position under the force of drive spring 267, and switch S2 is opened as the pin 267 by which switch S2 has so far been closed is moved away from the movable contact of switch S2, thereupon exposure operation and control circuit 33' begins to count the time interval which is determined by the timing circuit containing variable resistor VR3 and condenser C1. Upon termination of the counting, in other words, after the duration of the shutter time selected by lever 24, the solenoid of electromagnet 277 is deenergized to disengage the rear curtain 266 from latch lever 274, thereby the rear curtain 266 runs down to the fully closed position to terminate the exposure in the shutter preselection automatic exposure range.

(II-ii) Diaphragm preselection mode:

The film sensitivity selector dial 5 is operated to provide a signal Sv with variable resistor VR1, and then dial 3 is turned to place its symbol "F" in registry with index 4, thereby variable resistor VR2 provides no resistance value, because the sliders 373 and 374 are short-circuited with each other likewise as in the case of (II-i) - (B). This causes exposure operation and control circuit 33' to energize the solenoid of electromagnet 277, and therefore causes the shutter mechanism 26 to be electrically controlled. The setting of dial 3 to position "F" also causes switch S5 to be closed by the projection 3b of dial 3, thereby variable resistor VR3 is cut off from exposure operation and control circuit 33', and exposure operation and control circuit 33' is set to an operative position for deriving an exposure value representing an exposure time. Thus the camera is switched to the diaphragm preselection automatic daylight exposure range. In this case, no signal is applied from exposure operation and control circuit 33' to clutch mechanism 157 which remains in the inoperative position.

When the presetting ring 9 of lens mount 11 is turned to select a desired diaphragm value, the motion of ring 9 is transmitted through slide 279, slide or arm 7 and gear train 151 through 154 to slide 555, thereby variable resistor VR4 cooperating with slide 555 provides a resistance value corresponding to the selected diaphragm value as the electrical signal 105 (see FIG. 3).

Responsive to signals Sv and Av and the output of element 30, exposure operation and control circuit 33' derives an exposure value representing an exposure time. When release button 20 is depressed to the first step, switch S1 is closed in synchronism with the pivoting movement of mirror 50, causing the derived exposure value (in this case, representing the exposure time) to be memorized for the purpose of performing the automatic exposure time control operation despite the fact that the upward movement of mirror 50 interrupts the light path to the photosensitive element 30, and the automatic diaphragm operating mechanism 28 is operated to adjust the size of aperture of the lens aperture mechanism 29 from the maximum possible size to the preselected diaphragm value. Upon further depression of release button 20 to the second step, the front curtain 256 is disengaged from the latch lever 271 to run down to the fully opened position under the force of drive spring 265, thereby switch S2 is opened causing exposure operation and control circuit 33' to begin the counting of the derived exposure time. Upon termination of the counting, or after duration of the derived exposure time, the solenoid of electromagnet 277 is deenergized causing the rear curtain 266 to run down, thereby the exposure is terminated.

(II-iii) Flash mode:

When flash unit 12 is attached to camera body 1 at mount 22, the terminals T'12, T'13 and T'14 of flash unit 12 are connected to respective terminals T12, T13 and T14 of camera body 1, and detector lever 283 is turned in the counter-clockwise direction about pin 287, thereby the movable contact 291 of switch S4 is brought into contact with fixed contact 289 so that photosensitive element 30 is cut off from exposure operation and control circuit 33' and instead resistor R1 is connected to exposure operation and control circuit 33'.

Next the dial 3 is turned to place its symbol "F" in registry with index 4 as in the case of (II-ii), and the diaphragm presetting ring 9 is turned to select a particular diaphragm value suited for flash photography with flash unit 12, the particular diaphragm value being usually indicated at the light receiving window 14 of flash unit 12, whereupon a signal Av or 105 is applied to exposure operation and control circuit 33' likewise as in the case of (II-ii).

Upon closure of switch S7 of flash unit 12, the main condenser C3 is charged to a voltage by booster circuit 121. When the voltage of main condenser C3 has reached the predetermined level, the release button 20 may be depressed by the operator, thereby mirror 50 is pivoted upward, and the automatic diaphragm operating mechanism 28 is operated to adjust the size of the aperture of the lens aperture mechanism 29 from the maximum possible size to the value selected by ring 9. After that, the front curtain 256 begins to run down, thereupon switch S2 is opened causing exposure operation and control circuit 33' to begin the counting of a time interval determined by the timing circuit comprised of condenser C1 and resistor R1.

On the other hand, as the front curtain 256 is moved to the fully opened position, switch S3 is closed by projection 256a of the front curtain support member to actuate trigger circuit 36, thereby thyristor SCR1 is turned on to energize discharge tube 58. Light reflected from the object being photographed with flash illumination is received by photosensitive element 46 of flash unit 12, and element 46 in turn produces an output which is applied through terminal T'14–T14 and T10–T'10 connections to exposure operation and control circuit 33'.

Responsive to signals Sv and Av, a signal from R1 and the output of element 46, exposure operation and control circuit 33' computes the level of flash energy necessary to produce a correct flash lighting condition. When the amount of energy produced from discharge tube 58 has reached the level corresponding to the correct flash lighting condition, exposure operation and control circuit 33' produces a signal 107 (see FIG. 3) which is applied through terminal T'11–T11 and T13–T'13 connections to the control gate of thyristor SCR2 of flash unit 12, thereby thyristor SCR2 is turned on causing the voltage of condenser C2 to be applied through thyristor SCR2 to the anode-cathode of thyristor SCR1. At this time, thyristor SCR1 is turned off to terminate the energization of discharge tube 58. After that, the solenoid of electromagnet 277 is deenergized in response to termination of the counting of an exposure time by exposure operation and control circuit 33', thereby the rear curtain begins to run down to terminate the exposure in the flash mode.

Figure 9:
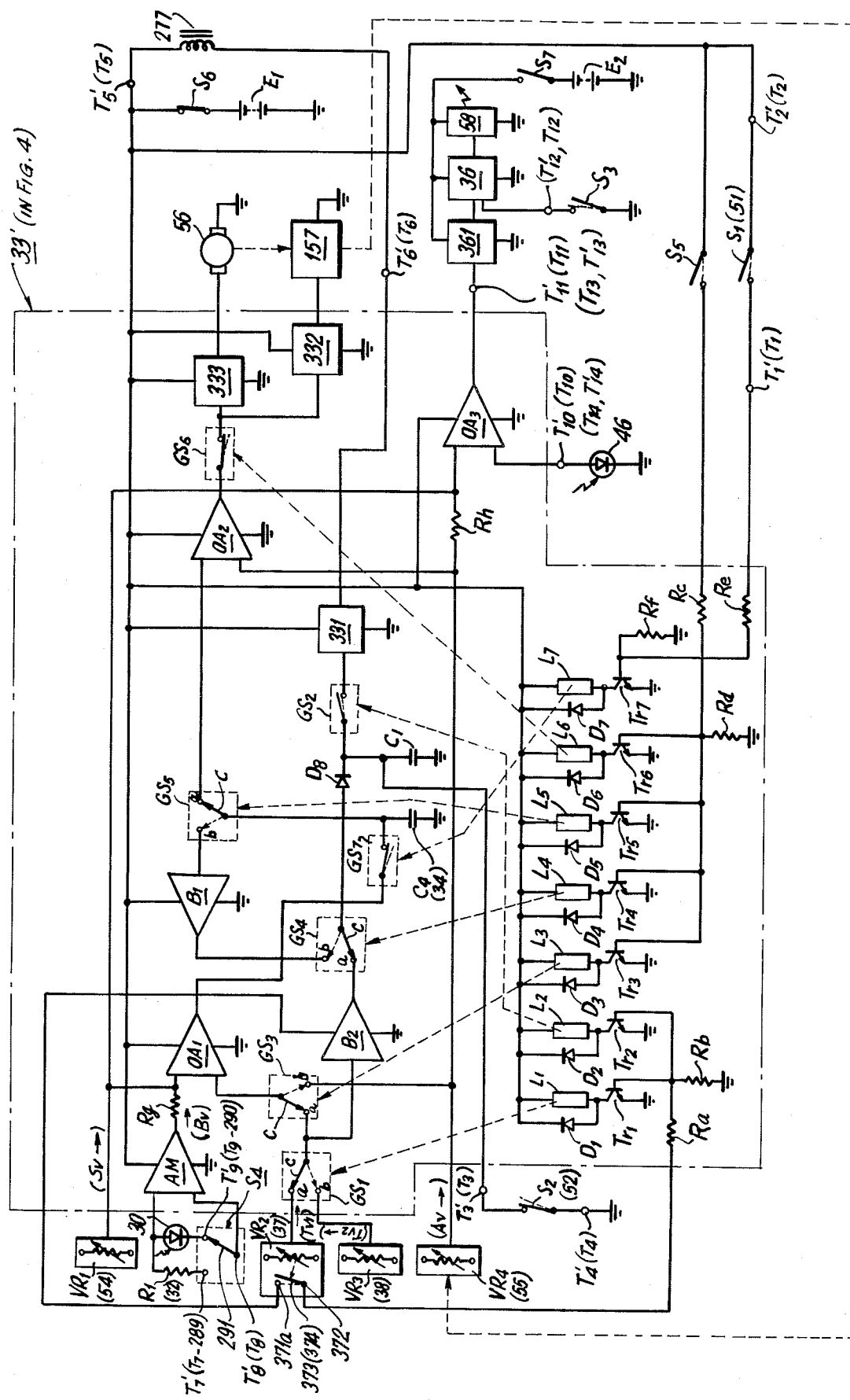
FIG. 9 is a detailed schematic representation showing the details of the exposure and control circuit of one embodiment of the invention relating to FIGS. 4a, 4b and 4c.

The operation of the exposure operation and control circuit 33' (as shown in FIG. 9) will next be explained in connection with the individual exposure control modes. A table is provided at the end of the specification to show different combinations of the switched positions of gate switches GS1 to GS6 with the different exposure control modes.

Shutter preselection mode:
(A) Shorter shutter time range

As the flash device 12 is not associated with the camera body 1, the switch S4 is in its movable contact 291-and-fixed contact 290 contacting position where the photocell 30 is connected to the amplifier AM. When the switch S6 is closed, the amplifier AM is set to amplify the output of the photocell 30 in logarithmic compression. The output of amplifier AM, that is, a Bv signal, and a Sv signal produced from the variable resistor VR1 are applied to one input terminal of the operational amplifier OA1.

On the other hand, the dial 3 is operated to place a desired shutter speed graduation other than the symbols "B" and "F" in registry with the index 4. In this case, the slider 373 of the variable resistor VR2 is not brought into contact with the conductive portion 371a of the resistance member 371, so that the transistors Tr1 and Tr2 remain in OFF state. Further, because of the maintenance of the switch S5 in its open position, the transistors Tr3 to Tr6 are not turned on. As a result, the relays L1 to L6 are not energized, permitting gate switches GS1, GS3, GS4 and GS5 to remain in their "a" positions, gate switch GS2 in the open position, and gate switch GS6 in the closed position (see the Table).

For this reason, the magnet control circuit 331, because of the setting of gate switch GS2 in the open position, does not operate, permitting the electro-magnet 277 to remain deenergized to effect no control for the operation of the shutter 26. Upon setting of the dial 3, the variable resistor VR2 produces a signal Tv1 with a magnitude corresponding to the shutter speed preselected on the dial 3. The signal Tv1 is transmitted through the contacts (a)–(c) path of gate switch GS1 and then through the contacts (a)–(c) path of gate switch GS3 to the other input terminal of the operational amplifier OA1.

Based on the signals Sv, Bv and Tv1, the operational amplifier OA1 performs a exposure operation and control, as logically expressed by the formula, $$Sv + Bv - Tv1$$

to determine an exposure value representing an effective aperture value. The output of operational amplifier OA1 is applied through gate switch GS7 (which is, at this time, in the closed position) both to the storage condenser C4 and to one input terminal of the operational amplifier OA2 through the (a)–(c) path of gate switch GS5. Responsive to the outputs of the operational amplifier OA1 and the variable resistor VR4, the operational amplifier OA2 produces an output signal with a polarity and magnitude respectively corresponding to the direction and degree of deviation of an actual aperture value occurring in the diaphragm device 29 of the photographing lens system 11, as preset on the variable resistor VR4, from the effective aperture value as determined by the operational amplifier OA1. The output signal of operational amplifier OA2 is applied to both of the control circuits 332 and 333, so that the clutch control circuit 332 causes actuation of the clutch 157 regardless of the polarity and magnitude of the output signal of amplifier OA2 provided that the magnitude is not zero, while the motor control circuit 333 drives the motor 56 for rotation in a direction dependent upon the polarity of the output signal of amplifier OA2, that is, in such a direction that the motor 56 rotates, and the degree of deviation of the actual aperture value from the determined effective aperture value is decreased.

The motion of the motor 56 is transmitted through the clutch 157, reduction device 156, gear train 155, 152 and 153, arm 7 and slider 279 to the preset ring 9 of the photographing lens system 11, and also through gear train 155, 152 and 151 and slider lever 55 to the variable resistor VR4 (see FIG. 4), thereby the size of aperture of the diaphragm device is varied with variation of the resistance value of variable resistor VR4 until the resistance value is balanced with the output of operational amplifier OA1. When the aperture value preset in the diaphragm device 29 reaches the effective aperture value determined by the operational amplifier OA1, the operational amplifier OA2 produces a "0" signal which causes the clutch control circuit 332 to take clutch 157 out of operation, and also causes motor 56 to stop rotating.

Next, when the release button 20 is depressed, the mirror 50 is moved upward and, at the same time, the automatic diaphragm drive device 28 is actuated to adjust the diaphragm device 29 to the preselected setting described above. In almost exact synchronism with the initiation of upward movement of the mirror 50, switch S1 is closed to turn-on transistor Tr7, thereby gate switch GS7 is opened under the action of relay L7. Therefore, despite the fact that the output of amplifier AM, that is, the signal Bv, is varied with variation of the output of operational amplifier OA1, as the mirror 50 moves upward to block the path of light entering the photocell 30, the operational amplifier OA2 operates in response to the above-identified effective aperture value stored in the storage condenser C4 as the variation of the output of operational amplifier OA1 does not affect the operation of storage condenser C4 and operational amplifier OA2.

Upon further depression of the release button 20, the shutter 26 is actuated. At this time, the magnet control circuit 331 does not operate because of the opening of gate switch GS2. Therefore, the period of actuation of the shutter 26 is mechanically controlled in accordance with the shutter speed preselected on the dial 3, (see the Specification in the (II-I) - (A) section).

(B) Longer shutter time range

The power switch S6 is thrown-in, then dial 3 is operated to place its symbol "B" in registry with index 4, and then the lever 24 is operated to select a desired shutter speed.

The setting of dial 3 with its symbol "B" in registry with index 4 causes the slider 373 of the variable resistor VR2 to be brought into contact with the conductive portion 371a of the resistance member 371, thereby transistors Tr1 and Tr2 are turned on to energize relays L1 and L2 either the result that gate switch GS1 is set from its "a" position to its "b" position, and gate switch GS2 is set from its open position to its closed position. It is to be noted that other gate switches GS3 to GS6 are set in the same positions as those occurring in the case of (A) described above (see the Table).

With this switching arrangement, instead of variable resistor VR2, variable resistor VR3 becomes connected with the input terminals of operational amplifier OA1 and buffer circuit B2, and the buffer circuit B2 becomes connected at its output terminal with the input terminal of magnet control circuit 333 which operates to energize electro-magnet 277 to hold the shutter rear curtain 266 in its locked position.

Responsive to the signal Tv2 corresponding to the shutter speed preselected on the variable resistor VR3 by the lever 24 and to the signals Sv and Bv, the operational amplifier OA1 produces an output representing an effective aperture value as a result of computation logically expressed as Sv + Bv − Tv2

In a manner described in connection with (A) above, operational amplifier OA2, clutch control circuit 332 and motor control circuit 333 are operated so that the presetting of diaphragm device 29 is effected for the computed aperture value.

Next, when release button 20 is depressed, the diaphragm device 29 is moved from its maximum aperture position to the presetting and then the shutter front curtain 265 begins to run down. As the shutter front curtain 265 runs down to the open position, switch S2 is opened to initiate the charging of timing condenser C1 from the buffer circuit B2. In a time interval substantially equal to the time constant determined by the variable resistor VR2 and timing condenser C1, namely, equal to the shutter speed preselected by the lever 24, electromagnet 277 is deenergized by the magnet control circuit 331 to release the shutter rear curtain from its locked position, thereby the shutter rear curtain runs down to terminate the exposure (see the related portion of the Specification at the (II-i) - (B) section).

Diaphragm preselection mode:

The power switch S6 is thrown in, and then dial 3 is set with its symbol "F" in registry with index 4, thereby the slider 373 of the variable resistor VR2 is brought into contact with the conductive portion 371a of the resistance member 371, and switch S5 is closed by the projection 3b of dial 3 to turn-on all transistors Tr1 to Tr6 to energize relays L1 to L6 with the result that gate switches GS1, GS3, GS4 and GS5 are set from their "a" positions to their "b" position, gate switch GS2 from its open position to its closed position, and switch GS6 from its closed position to its open position (see the Table).

With this switched arrangement, instead of variable resistor VR2 or VR3, variable resistor VR4 becomes connected with the input terminal of operational amplifier OA1, buffer circuit B1 becomes connected at its input terminal with the output terminal of operational amplifier OA1 and storage capacitor, thereby the magnet control circuit 331 is set to energize electromagnet 277 to hold the shutter rear curtain in its locked position. On the other hand, operational amplifier OA2 is taken out of operational amplifier OA1 and storage condenser C4, and control circuits 332 and 333 are taken out of operational amplifier OA2.

Next, when the diaphragm preset ring 9 of the photographing lens system 11 is operated to select a desired diaphragm value, the preselected diaphragm value information is transmitted through a slide member 279, transmission arm 7 and gear train 154–151 to the slide lever 555, and then converted to an electrical signal, that is, a signal Av by variable resistor VR4 which is then applied to operational amplifier OA1.

Based on the signals Sv, Bv and Av, operational amplifier OA1 performs an exposure operation and control logically expressed as Sv + Bv − Av to derive an exposure value representing an effective shutter speed, which is then stored in the storage condenser C4 after being transmitted through gate switch GS7.

Next, when release button 20 is depressed, mirror 50 moves upward, and at the same time, the diaphragm device 29 moves from the maximum aperture position to a position corresponding to the aperture value preset by the preset ring 9. Such upward movement of mirror 50 also causes closure of switch S1 which in turn causes the opening of gate switch GS7 under the action of relay L7 with the result that the exposure operation and control result stored in the storage condenser C4 is applied to buffer circuit B1.

Upon further depression of release button 20, the shutter front curtain 265 begins to run down, and switch S2 is opened to charge the timing condenser C1 from the buffer circuit B1. In a time interval dependent upon the output of operational amplifier OA1, the magnet control circuit 331 is set to deenergize electromagnet 277, thereby the shutter rear curtain begins to run down to terminate the exposure (see the portion of the Specification in section (II-ii).

Flash mode:

When the flash unit 12 is attached to the camera body 1, the detector lever 283 is actuated to move the movable contact 291 of switch S4 from the position for contact with the fixed contact 290 to the position for contact with the fixed contact 289, thereby photocell 30 is taken out of connection with amplifier AM and instead the resistor R1 is brought into connection therewith. The attachment of flash unit 12 to the camera body 1 also causes connection of operational amplifier OA3 at its one input terminal with the photosensitive element 46 provided in the flash unit 12 through interconnection terminals T'11–T11 and T13–T'13, and at its output terminal with the flash terminating circuit 362 through interconnection terminals T'10–T10, T14–T'14.

Next, the power switch S6 is turned on, and then dial 3 is set to place its symbol "F" in registry with index 4 likewise as in the case of diaphragm preselection mode, thereby gate switches GS1 to GS6 are set to the same positions as in the case of diaphragm preselection mode. Next, the main switch S7 provided in the flash unit 12 is turned on to make ready for flashing. As the flash unit 12 is to be operated with a particular diaphragm value specified for a particular film speed, the diaphragm device 29 is adjusted by the preset ring 9 to a particular setting. This preset diaphragm information is converted to a signal Av by variable resistor VR4 which is then applied to operational amplifier OA1 and OA3. Also applied to operational amplifier OA3 is the signal Sv from variable resistor VR1. An example of a series of combinations of different film speeds with the corresponding diaphragm values for the given flash unit is shown below.

| Given flash unit : Automatic flash energy control type strobo. Assigned diaphragm value F: 4 (for ASA 100) | |
| --- | --- |
| Film speed (ASA) | Diaphragm value to be preset |
| 25 | 2 |
| 50 | 2.8 |
| 100 | 4 |
| 200 | 5.6 |
| 400 | 8 |
| 800 | 11 |

When the above mentioned manipulation of the flash unit and camera body has been finished, operational amplifier OA1 is rendered responsive to the signals Sv, Bv and Av (in this case, the signal Bv is supplied from resistor R1 specified for a particular shutter speed, for example, 1/60 second suitable for use in the flash mode), to produce an output which is then transmitted to and stored in storage condenser C4. After the flash unit is made ready for firing of the flash tube, release button 20 may be depressed. The depression of release button 20 causes upward movement of mirror 50 and simultaneously causes adjustment of the diaphragm device 29 from the maximum aperture position to a position determined by the presetting, and also causes movement of gate switch GS7 to its open position to apply the computed result from storage condenser C4 to buffer circuit B1.

Upon further depression of release button 20, the shutter front curtain 265 begins to run down, and switch S2 is opened to charge the timing condenser C1 from buffer circuit B1. It is to be noted that the magnet control circuit is in operative pisition where the shutter rear curtain 266 is locked by electromagnet 277. When the front curtain 265 has reached the fully open position, switch S3 is closed to actuate trigger circuit 36 to initiate the firing of discharge tube 58.

As the light reflected from an object being photographed with flash illumination is received by photosensitive element 46 of flash unit 12, the ever-varying amounts of flash light energy produced from discharge tube 58 are compared with the critical lever dependent upon the signals Sv and Av for correct flash exposure by operational amplifier OA3. When the amount of flash energy has reached the critical level, operational amplifier OA3 produces an output which causes the flash terminating circuit 361 to terminate the duration of firing of discharge tube 58, through trigger circuit 36. After the time interval defined substantially by resistor R1 from the initiation of charging of timing condenser C1, the magnet control circuit is set to deenergize electro-magnet 277, thereby the shutter rear curtain is caused to run down to terminate the flash exposure (see the related portion of the specification in section (II-iii).

Figure 5:
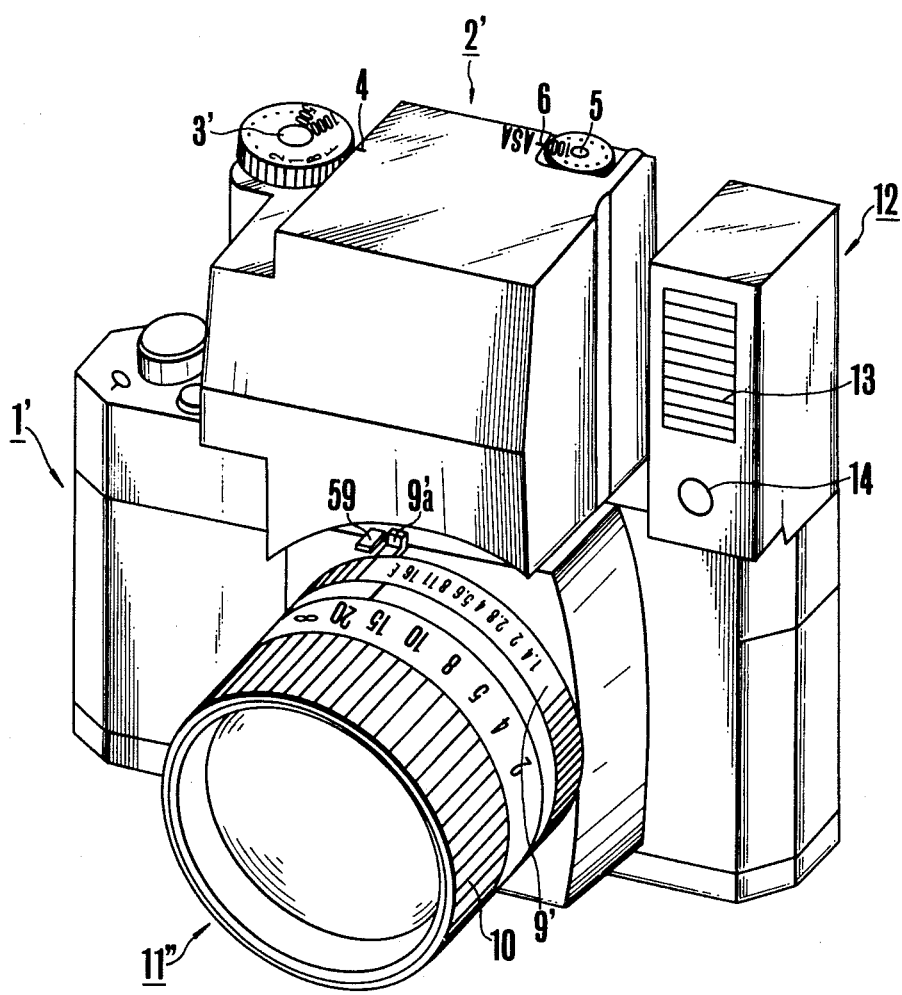
FIG. 5 is a perspective view of another embodiment of an exposure operation and control adapter unit according to the present invention as detachable mounted on a single lens reflex camera with a flash unit mounted thereon.
Figure 6:
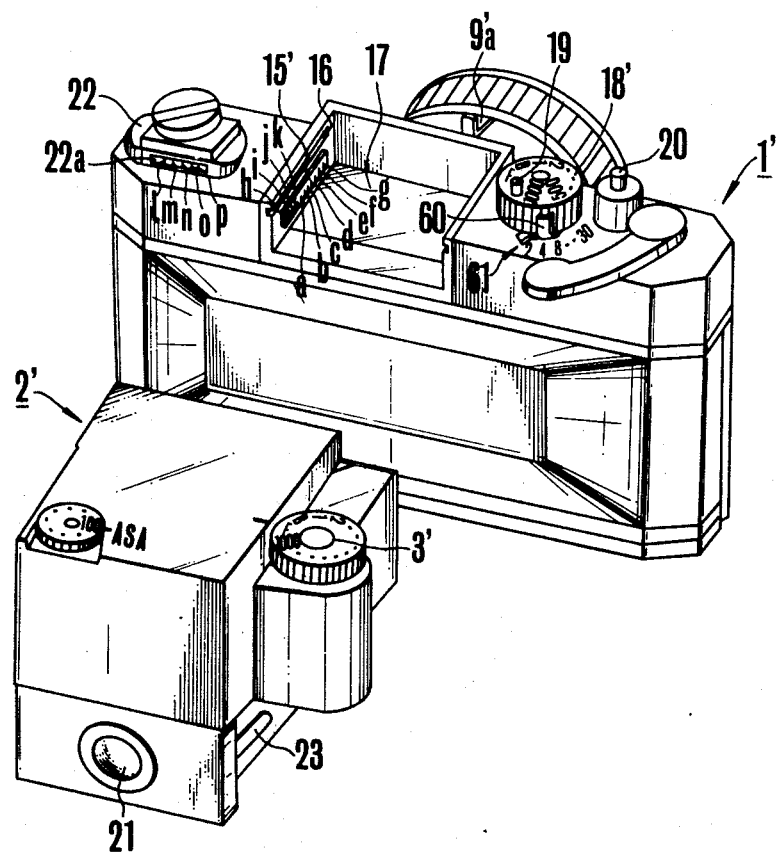
FIG. 6 is a perspective view of the exposure operation and control adapter unit of FIG. 5 as detached from the camera body.
Figure 7A:
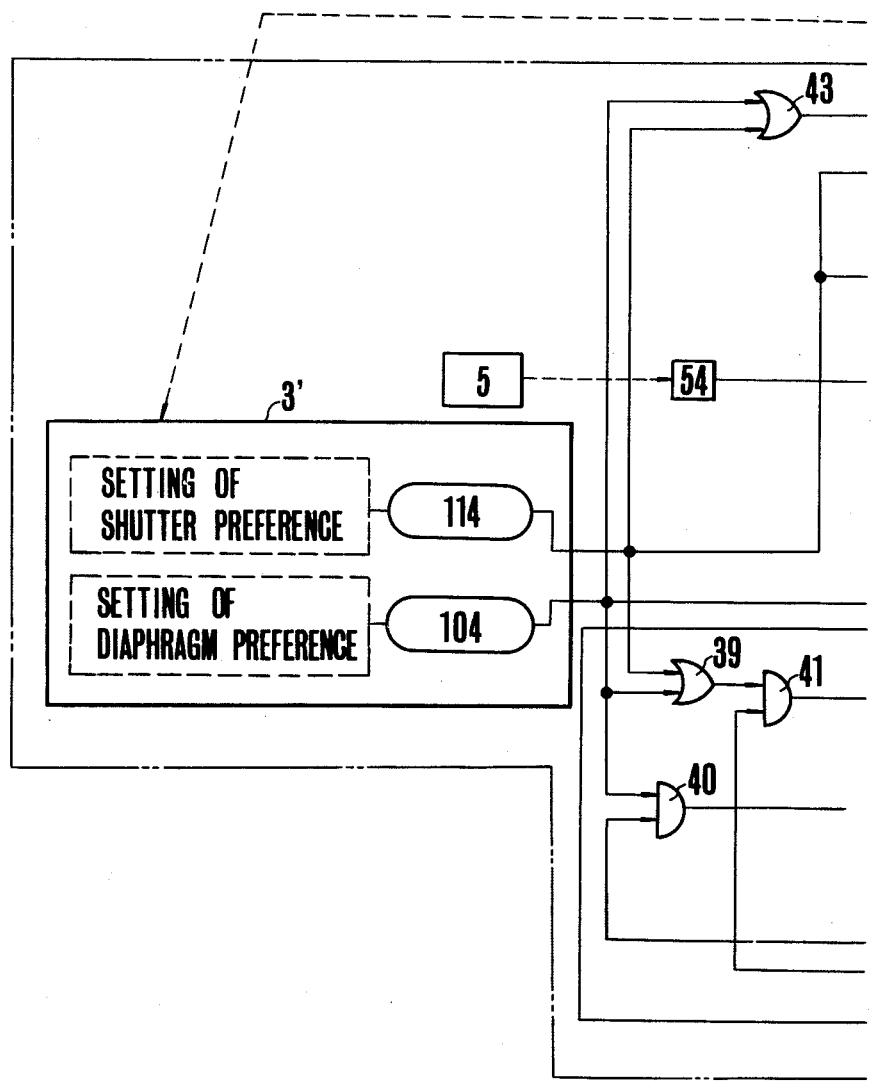
FIG. 7 is a block diagram schematically illustrating an automatic exposure control system for daylight and flash photography which is established by combination of the exposure operation and control adapter unit, camera body, lens aperture mechanism and flash unit according to the embodiment of FIGS. 5 and 6.
Figure 7B:
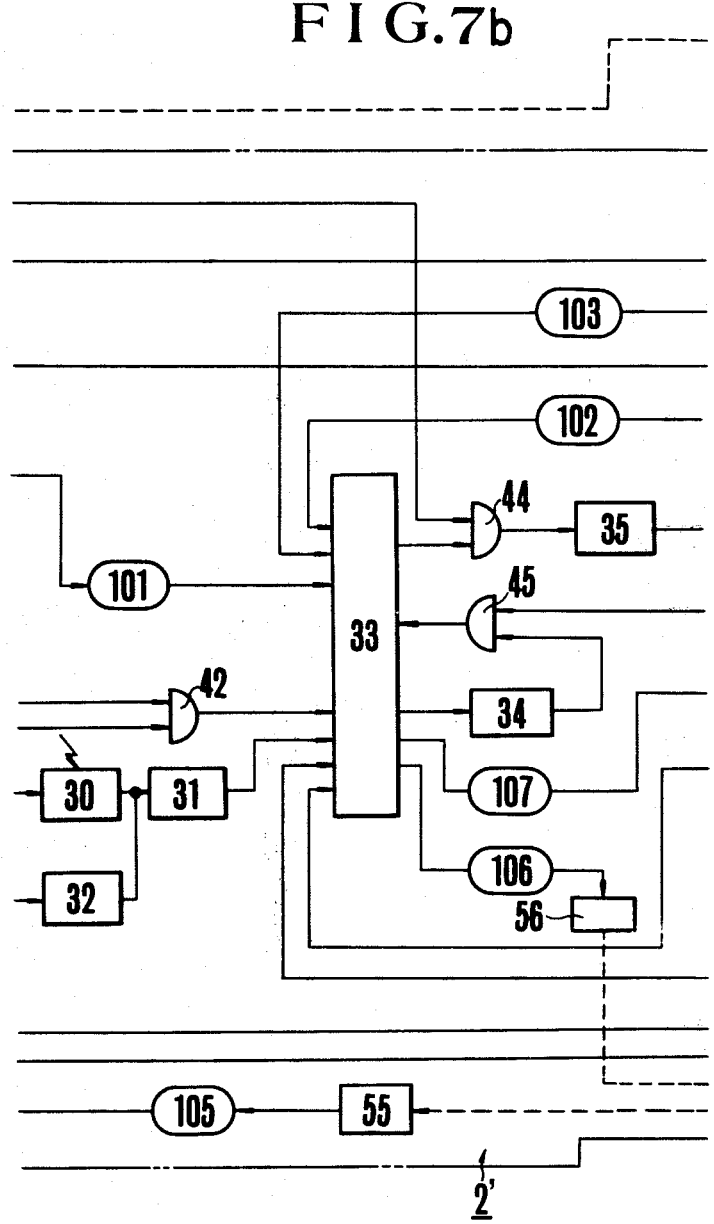
Figure 7C:
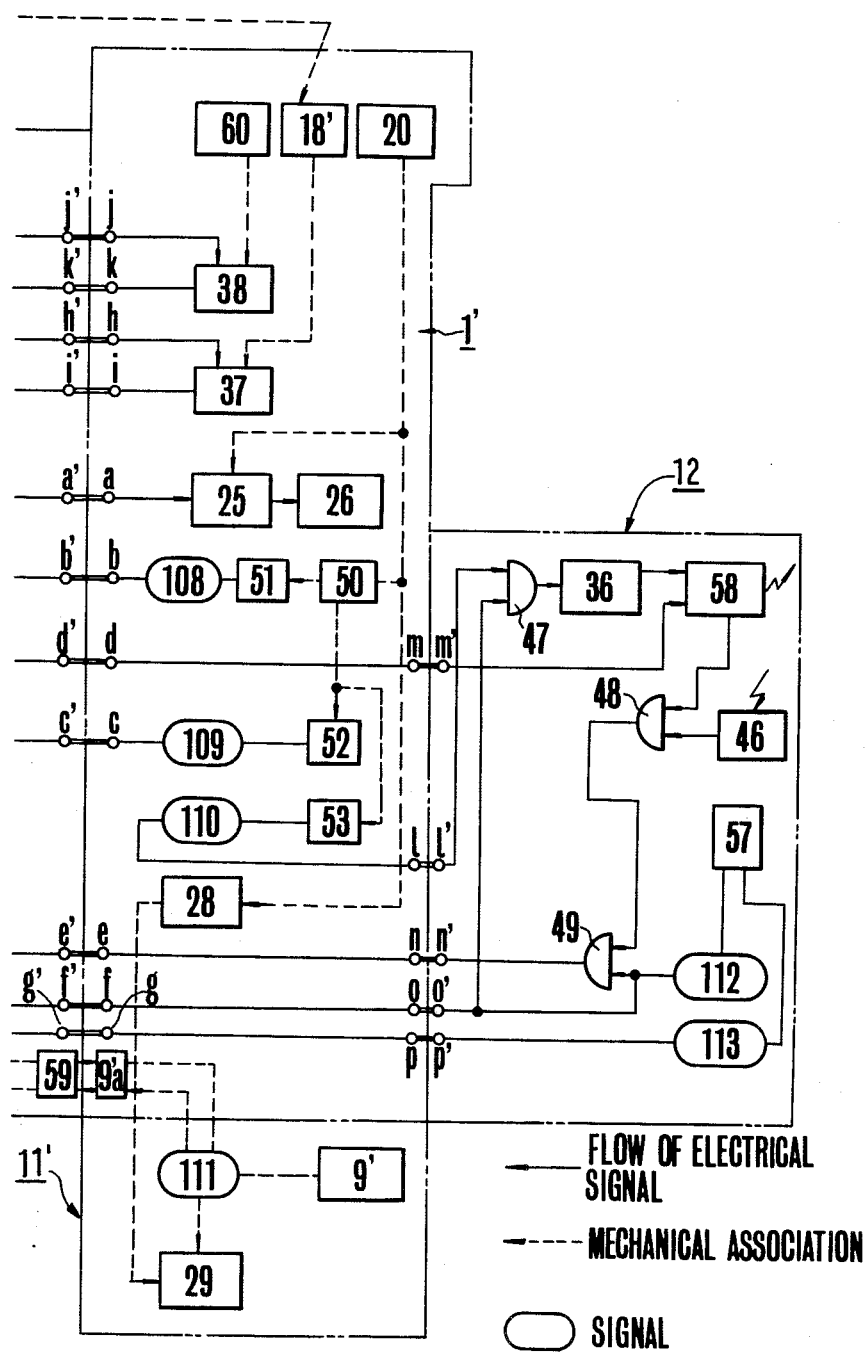

With reference to FIGS. 5 through 8, there is shown another embodiment of an automatic exposure control operation and control adapter unit according to the invention, wherein the diaphragm presetting means of the lens mount is directly connected to the adapter unit, and the shutter time signal source is provided in the camera body. In FIGS. 5, 6 and 7, the same numerals have been employed to denote the parts having similar constructions and functions to those of parts of FIGS. 1, 2 and 3, and part of the signal paths which remain unchangedfrom the embodiment of FIGS. 1, 2 and 3. Therefore, description of these parts will be omitted provided that the understanding of the invention is not diminished thereby.

In FIG. 5, a camera body 1' is provided with an exposure operation and control adapter unit 2' for automatic exposure control detachably mounted thereon and constructed in accordance with the present invention, with a flash unit 12 detachably mounted thereon, and with an interchangeable objective lens mount 11' detachably mounted thereon. The exposure operation and control adapter unit 2' has a fast shutter speed selector dial 3' which serves to select the shutter preselection and diaphragm preselection modes, and a diaphragm value signal transmitting slide 59 arranged to be engageable with a diaphragm presetting lever 9'a of ring 9' provided in the lens mount 11'.

In FIG. 6, camera body 1' has a connector 15' provided with terminals a through K for electrical connection with exposure operation and control adapter unit 2', a first shutter speed selector 18' arranged to provide a range of shutter speeds faster than one second, a second shutter speed selector lever 60 arranged to provide a range of shutter speeds 1 slower than one second, and a series of graduations 61 indicative of the slower shutter speeds arranged along the path of movement of the end of lever 60 and gravured on the surface of the camera housing. For flash photography according to this second embodiment, the flash unit 12 shown in connection with the first embodiment may be used without modification.

FIG. 7 shows an automatic exposure control system established by combination of the above mentioned camera body 1', exposure operation and control adapter unit 2', objective lens mount 11' and flash unit 12, wherein almost all of the parts of the system are similar in fundamental construction and circuitry to those of the system of FIG. 3. Therefore, the essential parts different from those shown in FIG. 3 will be explained hereinbelow.

The first and second shutter speed signal generating means 37 and 38 are provided in camera body 1' but not in exposure operation and control adapter unit 2' as in the first embodiment, the first means 37 being mechanically connected to selector dial 18', while the second means 38 being mechanically connected to selector lever 60. The selector dial 3' of exposure operation and control adapter unit 2' is constructed so that when the diaphragm preselection mode is employed, a diaphragm preselection signal 104 is produced therefrom, and when the shutter preselection mode is employed, a shutter preselection signal 114 is produced therefrom. The signal 114 is transmitted through a terminal h'–h connection to the first shutter speed signal generating means 37 and also through a terminal j'–j connection to the second shutter speed signal generating means 38. The first signal generating means 37 produces an electrical signal 102 with a magnitude proportional to the shutter speed selected by dial 18' only when the selection of the shutter speed by dial 18' is combined with the selection of the shutter preselection mode, the signal 102 being applied through a terminal i–i' connection to exposure operation and control circuit 33. The second signal generating means 38 produces an electrical signal 103 with a magnitude proportional to the shutter speed selected by lever 60 only when the selection of the shutter speed by lever 60 is combined with the selection of the shutter preselection mode, the signal 103 being applied through a terminal k–k' connection to exposure operation and control circuit 33.

Although the shutter control device 25 of the first embodiment is constructed so that the closing operation of the shutter 26 is either electrically or mechanically controlled depending upon whether the shutter speed is selected from the longer or shorter range, the shutter control device of the second embodiment controls the closing operating of the shutter always electrically no matter how long the selected shutter speed is.

The operation of the automatic exposure control system of FIG. 7 will be explained in connection with the two modes, namely, (III-i) the shutter preselection automatic exposure range; and (III-ii) the diaphragm preselection automatic exposure range. The exposure operation in the flash mode is similar to that shown in connection with the flash mode (I-iii), and therefore will not be explained.

(III-i) Shutter preselection mode:

The film sensitivity selector dial 5 is turned to place a graduation representing the sensitivity of the used film in registry with index 6, thereby a signal Sv or 101 is applied to central processing circuit 33. Next, the diaphragm presetting ring 9' is turned to place its symbol "E" in registry with an index not shown. When dial 3' of exposure operation and control adapter unit 2' is set from its "F" position to the "B" position where symbol "E" is in registry with index 4, the camera is switched to the shutter preselection automatic exposure range, thereby a shutter preselection signal 114 is transmitted through a terminal h'–h connection and a terminal j'–j connection to the first and second signal generating means 37 and 38 of camera body 1' respectively. When a desired shutter speed is selected by dial 3', the first signal generating means 37 cooperating dial 18' produces a signal Tv1 or 102 which is then applied through a terminal i–i' connection to exposure operation and control circuit 33. When a desired shutter speed is selected by lever 60, the second signal generating means 38 cooperating with lever 60 produces a signal Tv2 or 103 which is then applied through a terminal k–k' connection to exposure operation and control circuit 33. It is to be noted that before lever 60 is operated to select the desired shutter speed, dial 3' with dial 18' must be set in position "B". Because of employment of no flash unit 12, the output of photosensitive element 30 is applied through logarithmic converter 31 to exposure operation and control circuit 33. Responsive to signals Sv, Tv1 or Tv2, and the output signal from element 30, exposure operation and control circuit 33 derives an exposure value representing an effective exposure aperture in the form of a diaphragm control signal 106 which is then converted to a corresponding mechanical signal 111 by diaphragm value signal converting means 56 is transmitted to the diaphragm value signal transmitting lever 59 and further through the lever 9'a of the diaphragm presetting ring 9' engaging with slide 59 to the lens aperture mechanism 29. In this state, the release button 20 may be depressed to initiate an exposure. The period of actuation of the shutter 26 is electrically controlled in accordance with the magnitude of signal Tv1 or Tv2.

(III-ii) Diaphragm preselection mode:

When dial 3' of exposure operation and control adapter unit 2' is set to position "F" and when the diaphragm presetting ring 9' is operated to select a desired diaphragm value, a diaphragm value signal 111 is transmitted to the lens aperture mechanism 29 and is also through lever 9'a and slide 59 to exposure operation and control adapter unit 2' in which it is converted to an electrical signal Av or 105 by signal generating means 55. The signal Av is applied through AND gate 42 to exposure operation and control circuit 33. Exposure operation and control circuit 33 determines an exposure time in conformance with the preselected diaphragm value. When release button 20 is depressed, an exposure operation proceeds in a manner similar to that shown in connection with the mode (i–ii) of the first embodiment.

Referring now to FIG. 8, there is shown a practical example of the system of FIG. 7, wherein the same numerals have been employed to denote the parts having similar construction and functions to those of the parts of FIGS. 1 through 7, and wherein almost all of the parts of the devices, mechanisms, means and elements of FIG. 8 are similar to those of the practical example of FIG. 4. Therefore, the essential parts different from those shown in FIG. 4 will be explained hereinbelow.

The variable resistor VR2 as the first signal generating means 37 comprises a resistor member 371 connected to a terminal T16 and a conductor member 372 connected to a terminal T16, these members 371 and 372 cooperating respectively with sliders 373 and 374 fixedly carried on a common projection 18'a radially extending from dial 18', and the terminals T15 and T16 being connected to respective materials T'15 and T'16 of exposure operation and control adapter unit 2'. Therefore, when dial 18' is operated to select a desired shutter speed, the variable resistor VR2 produces an electrical signal Rv1 or 102 (see FIG. 7) with a magnitude corresponding to the selected shutter speed which is applied to exposure operation and control circuit 33'.

The variable resistor VR3 as the second signal generating means 38 comprises a resistor member 381 connected to a terminal T18 and a conductor member 382 connected to a terminal T17, these members 381 and 382 cooperating respectively with sliders 383 and 384 fixedly carried on a common projection 601 radially extending from disc 601 fixedly secured to lever 60, and the terminals T17 and T18 being connected to respective terminals T'17 and T'18 of exposure operation and control adapter unit 2'. Therefore, when lever 60, is operated to select the desired shutter speed, variable resistor VR3 produces an electrical signal Tv2 or 103 (see FIG. 7) with a magnitude corresponding to the selected shutter speed which is then applied.

The selector dial 3' of exposure operation and control adapter unit 2' is provided with a projection 3'a arranged to cooperate with switch S5 in such a manner that when the symbol "F" of dial 3' is in registry with index 4 or when the camera is set in the diaphragm preselection mode, switch S5 is closed to produce the diaphragm preselection signal 104 (see FIG. 7), and when dial 3 is turned to place symbol "F" out of registry with index 4, switch S5 is opened to produce the shutter preselection signal 114 (see FIG. 7), these signals 104 and 114 being applied to exposure operation and control circuit 33' individually.

The diaphragm value signal transmitting slide 59 of which sliding movement is guided by a pair of pin 591 and slot 59b connections has a projection 59a engaging with the diaphragm presetting lever 9'a and a racked portion 59c engaging a gear 154 of the gear train which serves to transmit the motion of slide 59 to slide 555 cooperating with variable resistor VR4. The racked portion 59c is also connected through the gear train to the reduction gearing mechanism 156.

Figure 8A:
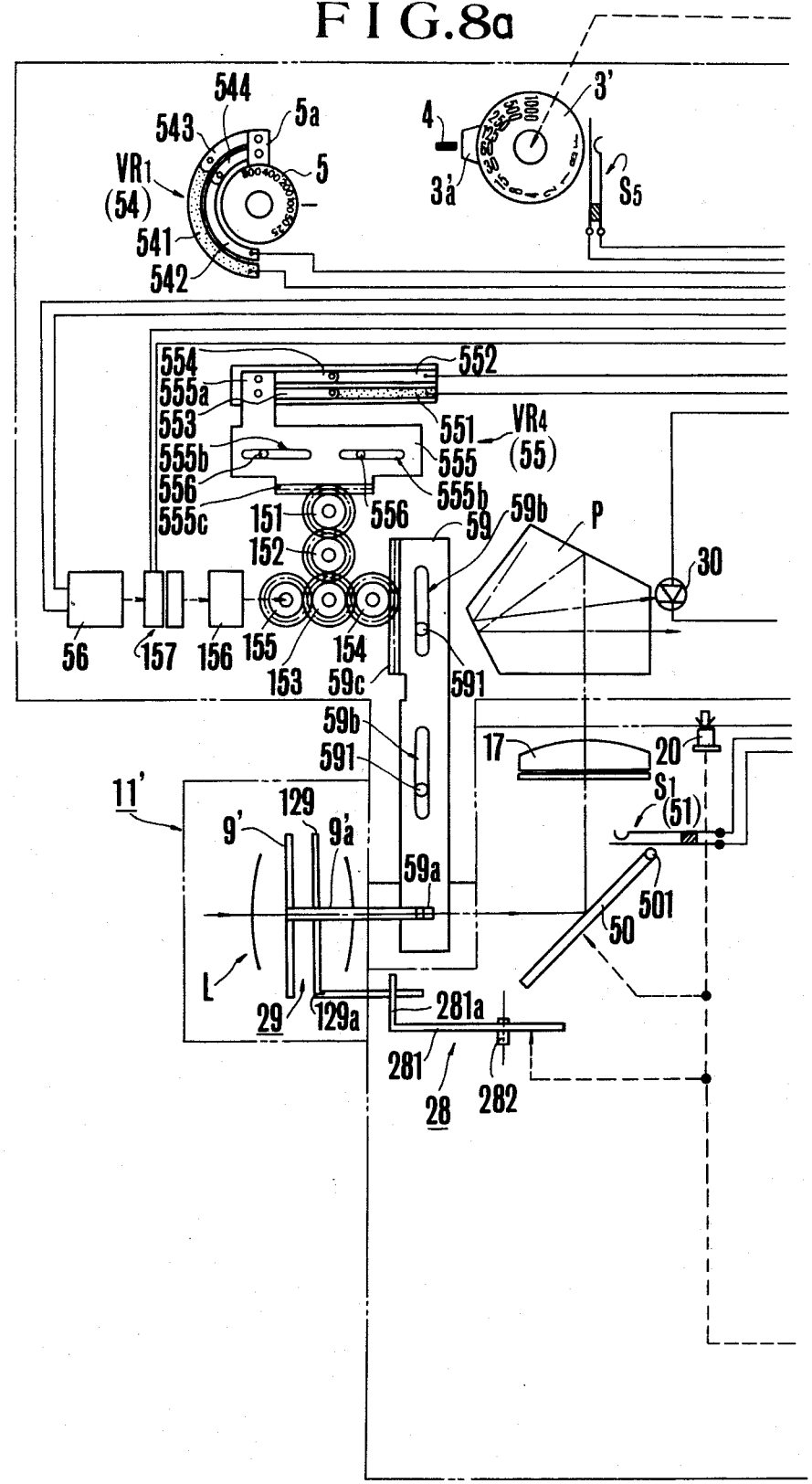
Figure 8B:
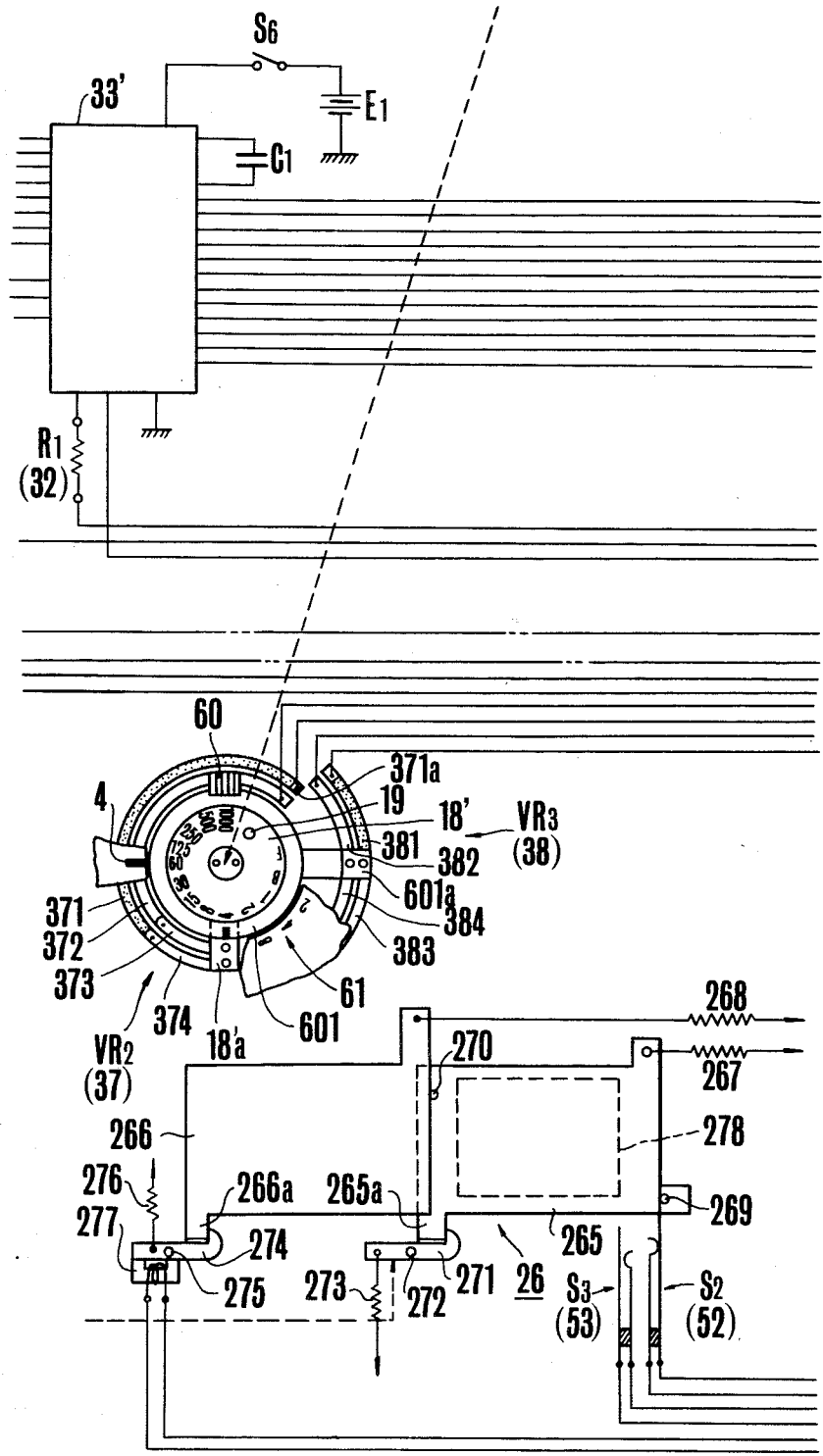
Figure 10:
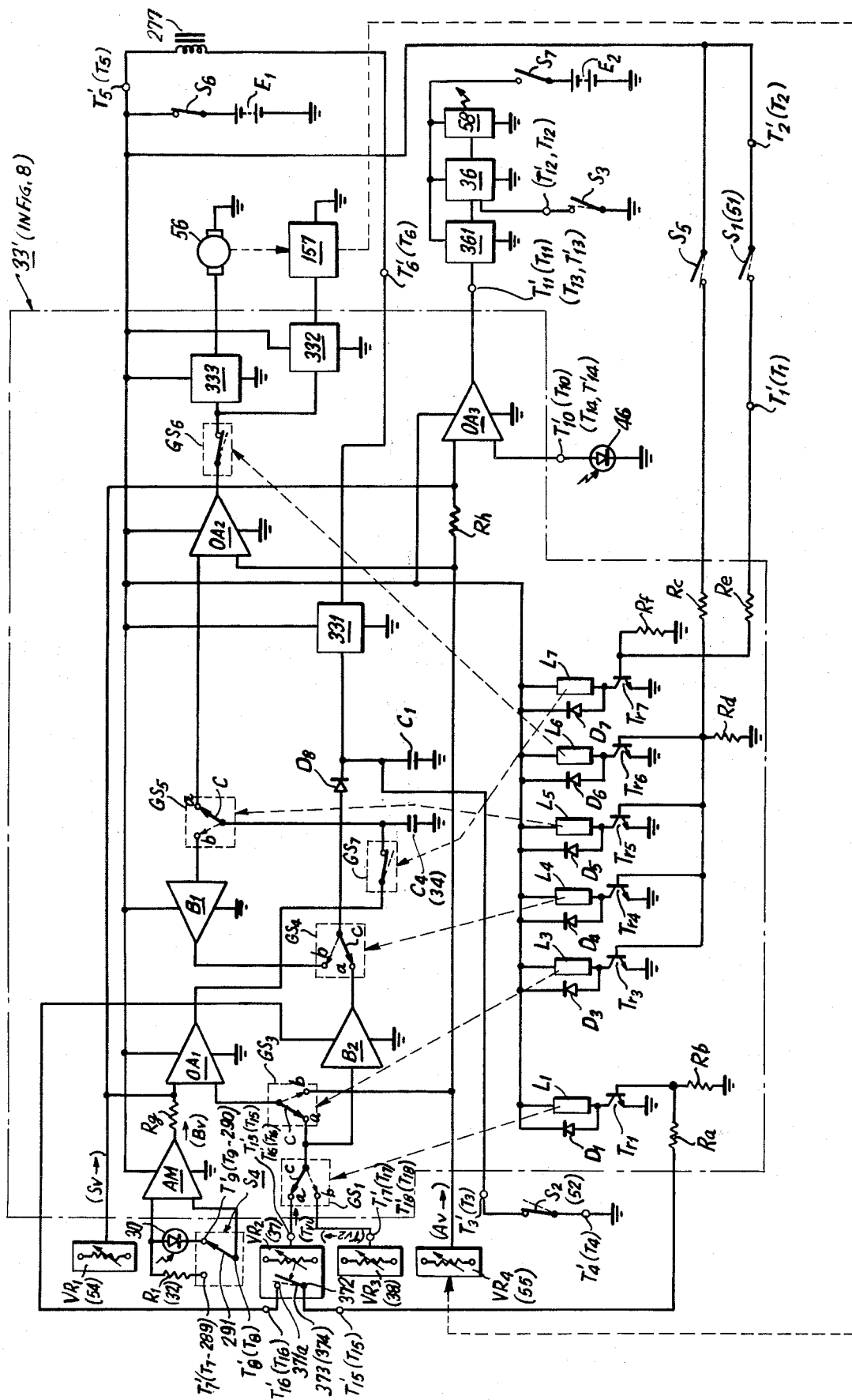
FIG. 10 is a detailed schematic representation of the exposure operation and control circuit of the FIGS. 8a, 8b and 8c embodiment.

FIG. 10 is a circuit diagram showing the details of the exposure operation and control circuit 33' of FIGS. 8a, 8b and 8c which are substantially unchanged from those of FIG. 4d in construction and arrangement except for the following three points:

(1) Gate switch GS2, relay L2, transistor Tr2 and diode D2 are omitted.

(2) The fixed contact (a) of gate switch GS1 is connected through interconnection terminals T'15–T15 and T'16–T16 to variable resistor VR2, and its fixed contact (b) is connected through interconnection terminals T'17–T17, T'18–T18 to variable resistor VR3.

(3) The conductive portion 371a of the resistance member 371 of variable resistor VR2 is connected through interconnection terminals T16–T'16 to power switch S6, and the conductive member 372 through interconnection T15–T'15 to resistor Ra connected to the vase of transistor Tr1.

The operation of the apparatus of FIG. 8 is as follows:

(IV-i) Shutter preselection mode:

At first, the power switch S7 of exposure operation and control adapter unit 2' is closed to supply an electrical energy to exposure operation and control adapter unit 2', thereby the solenoid of electromagnet 277 is energized by exposure operation and control circuit 33' through terminal T'5–T5 and T'6–T6 connections to latch the rear curtain 266 through lever 274.

On the other hand, dial 5 is turned to select a particular graduation indicative of the sensitivity of the used film, and then the diaphragm presetting ring 9' is turned to place symbol "E" in registry with the index. Further dial 3' of exposure operation and control adapter unit 2' is moved from position "F" so that the camera is set to the shutter preselection mode, and exposure operation and control circuit 33' is rendered operative to derive an effective exposure aperture value and to produce a control signal for the electromagnetic clutch 157.

When an exposure is made with a shutter speed faster than one second, dial 3 is operated to select the shutter speed, thereby causing variable resistor VR2 to produce a signal Tv1 or 102 which is applied through terminal T15–T'15 and T16–T'16 connections to exposure operation and control circuit 33'.

On the other hand, when an exposure is made with a shutter speed slower than one second, dial 3' is set to position "B" and then lever 60 is operated to select the desired shutter speed, thereby causing variable resistor RV2 to produce no signal Tv1 or 102, and, instead, causing variable resistor VR3 to produce a signal Tv2 or 103 which is applied through terminal T17–T'17 and T18–T'18 to exposure operation and control circuit 33'.

When the settings of these various exposure control parameters have been terminated, exposure operation and control circuit 33' derives an effective exposure aperture, and motor 56 is driven for rotation to adjust the position of the lens aperture mechanism 29 in accordance with the derived effective exposure aperture through the intermediary including the electromagnetic clutch 157, reduction gearing 156, gear train 155, 153 and 154, signal transmitting slide 59 and presetting ring 9', and simultaneously to adjust the position of variable resistor VR4 through the gear train 152 and 151.

When release button 20 is depressed, mirror 50 is moved upward and the size of the aperture of the lens aperture mechanism 29 is adjusted to the derived exposure value. After that, the front curtain 256 begins to run down causing switch S2 to produce a count start signal 109. Upon advent of signal 109, exposure operation and control circuit 33' starts to count a time interval determined the timing circuit to be described below. At the time when the counting is terminated, electromagnet 277 is turned off, thereupon the rear curtain 266 runs down to terminate the exposure in the shutter preselection automatic exposure range.

It is to be noted that when the shutter speed is selected by dial 3' the timing circuit containing variable resistor VR2 and condenser C1 is rendered operative, while when the shutter speed is selected by lever 60, the timing circuit containing variable resistor VR3 and condenser C1 is rendered operative.

(IV-ii) Diaphragm preselection range mode:

When dial 3' is set to position "F", switch S5 is closed by projection 3'a of dial 3' to cut off variable resistors Vr2 and Vr3 from exposure operation and control circuit 33', thereby exposure operation and control circuit 33' is set so as to derive an exposure time. At this time, no control signal is applied from exposure operation and control circuit 33' to electromagnetic clutch 157, so that clutch 157 remains in the inoperative position.

Next, the diaphragm presetting ring 9' of lens mount 11' is turned to select a desired diaphragm value, and this diaphragm preset signal 111 is transmitted through preset lever 9'a, slide 59 and gear train 154, 153, 152 and 151 to variable resistor VR4 by which it is converted to an electrical signal 105 which is then applied to exposure operation and control circuit 33'. At this time, exposure operation and control circuit 33' derives a shutter time in a manner similar to that shown in connection with (II-ii) mode.

When release button 20 is depressed, mirror 50 is moved upward, and the size of the aperture of the mechanism 29 is adjusted to the selected diaphragm value. After that, the front curtain runs down causing switch S2 to produce a count start signal 109. Upon advent of signal 109, exposure operation and control circuit 33' starts to count the shutter time, and, upon termination of the counting, deenergizes the solenoid of electromagnet 277, thereupon the rear curtain runs down to terminate the exposure in the diaphragm preselection atuomatic exposure range.

The operation of the central processing circuit of FIG. 10 proceeds in the same manner as that shown in connection with FIG. 4d, except that, the shutter preselection mode operates with shutter 26 of which operation is electrically controlled by control circuits 331 through electromagnet 277 regardless of whether the preselected shutter speed is in the shorter or longer shutter time range.

It will be seen from the foregoing description that the present invention provides an adapter type exposure operation and control unit of high performance for a photographic camera which is characterized in developing a function both of deriving an exposure value representing an effective exposure aperture in automatic response to preselection of an exposure time, and of deriving an exposure value representing an exposure time in automatic response to preselection of an effective exposure aperture when the adapter type exposure operation and control unit of the invention is combined with a camera having no particular exposure control mechanisms other than the shutter and diaphragm mechanisms. This feature of the invention realizes high standard systematization of photographic cameras with various parts thereof being made interchangeable, from which many advantages can be derived. For example, when the provision for sensing the object brightness level and determining an exposure value is made at the exposure operation and control adapter unit, the camera body may embody a performance which is necessary at minimum for the exposure purposes, thereby facilitating the compactness of the camera structures and reduction of the bulk and weight along with the production cost thereof. With an interchangeable finder adapter for manual exposure control system in addition of the adapter type exposure operation and control unit for automatic exposure control system of the character described according to the invention, it is possible to select the performance of the camera depending upon either whether or not the automatic exposure control is preferred in photographing a given object, or which exposure control mode is preferred. As shown in the first embodiment of the invention, it is further possible to utilize the adapter type exposure operation and control unit of the invention in controlling the period of energization of the flash tube associated with the camera in accordance with the correct flash lighting condition. In this case, the flash unit necessitates no particular exposure operation and control circuit system therefor. This is advantageous in facilitating the compactness and simplicity of the flash unit.

Table
Switched positions of gate switches GS1 to GS6 with reference to different exposure control mode

| Exposure control mode | | GS1 | GS2 | GS3 | GS4 | GS5 | GS6 |
|---|---|---|---|---|---|---|---|
| Shutter preselection mode | Short time set | a | OPEN | a | a | a | CLOSE |
| | Long time set | b | CLOSE | | | | |
| Diaphragm preselection mode | | b | CLOSE | b | b | b | OPEN |
| Flash mode | | b | CLOSE | b | b | b | OPEN |

Note: in the case of FIG. 8d, there is no need of gate switch GS2.

What is claimed is:
1. A camera system comprising:
  (a) a camera body unit having:
    (1) shutter means arranged to provide different exposure times;
    (2) exposure time setting means for said shutter means, said exposure time setting means being arranged to select an exposure time value and having a non-selecting position incapable of selecting any exposure time values beyond a selecting range thereof;
    (3) diaphragm means arranged to provide different aperture sizes;
    (4) aperture value setting means for said diaphragm means, said aperture value setting means being arranged to select an aperture value; and
    (5) detecting means for detecting a state of preparation for flash photographing;
  (b) a flash unit for the flash photographing, said flash unit having:
    (1) flash light emitting means for emitting a flash light to an object to be photographed; and
    (2) light responsive means arranged to receive the flash light emitted from said emitting means and then reflected from said object, said responsive means providing an electrical signal when receiving said reflected flash unit; and
  (c) a control unit for automatic exposure, said control unit having:
    (1) light measuring means for measuring the brightness of said object, said measuring means providing an electrical output representing the object brightness;
    (2) exposure time fixing means for fixing the exposure time at a value suitable for the flash photographing;
    (3) exposure control circuit means for determining a proper exposure value, said circuit means being arranged to selectively receive the electrical output of said light measuring means, exposure time value information set by said exposure time setting means, exposure time value information fixed by said exposure time fixing means, aperture value information set by said aperture value setting means and the electrical signal provided by said light responsive means and arranged to be selectively operable according to the following three operation modes:

(i) a first operation mode in which said circuit means determines a proper aperture value on the basis of the electrical output of said light measuring means and the exposure time value information set by said exposure time setting means and controls said shutter means according to the exposure time value information set by the exposure time setting means;

(ii) a second operation mode in which said circuit means determines a proper exposure time value on the basis of the electrical output of said light measuring means and the aperture value information set by said aperture value setting means and controls said shutter means according to the determined proper exposure time value information; and (iii) a third operation mode in which said circuit means determines the light amount to be emitted from said flash unit on the basis of the aperture value information set by said aperture value setting means and the electrical signal provided by said light responsive means and controls said shutter means according to the exposure time value information fixed by said exposure time fixing means; and (4) mode selecting means for selecting the operation mode of said circuit means between said first and second operation modes, said mode selecting means being operatively associated with said exposure time setting means and setting the operation mode of the circuit means to said first operation mode when the exposure time setting means is at a selecting position within said selecting range while setting the operation mode of the circuit means to said second operation mode when the exposure time setting means is at said non-selecting position;

said detecting means of the camera body unit detecting the state of preparation for the flash photographing of said flash unit and changing the operation mode of said circuit means from said second operation mode to said third operation mode by connecting said exposure time fixing means to the circuit means while disconnecting said light measuring means from the circuit means in the state of said second operation mode when detecting the completion of preparation for the flash photographing of the flash unit;

whereby automtic exposures according to exposure time preselection mode, aperture value preselection mode and flash photographing mode are made possible.

2. A camera system according to claim 1, wherein said control unit further includes:

(a) first means for providing said exposure time value information set by said exposure time setting means to the circuit means;

(b) second means for providing said aperture value information set by said aperture value setting means to the circuit means;

(c) first control means for controlling the operation of said shutter means in accordance with the exposure value representing the exposure time derived from said circuit means; and (d) second control means for controlling said diaphragm means in accordance with the exposure value representing the aperture value derived from said circuit means.

3. A camera system according to claim 2, wherein said camera body unit further includes means for converting said exposure time value information set by said exposure time setting means to an electrical signal, said converting means being mechanically connected to said exposure time setting means and being arranged for electrical connection to said first information providing means of said control unit.

4. A camera system according to claim 3, wherein said converting means comprises a variable resistor arranged to provide a range of different resistance values in response to the change in the selecting position of said exposure time setting means and arranged for cooperation with said first information providing means of said control unit.

5. A camera system according to claim 4, wherein said converting means further comprises output terminal means electrically connected to said variable resistor and arranged for electrical connection to said first information providing means of said control unit.

6. A camera system according to claim 5, wherein said first information providing means of said control unit comprises input terminal means electrically connected to said circuit means and arranged for electrical connection to said output terminal means of said converting means.

7. A camera system according to claim 2, wherein said first information providing means of said control unit comprises means for converting said exposure time value information set by said exposure time setting means to an electrical signal, said converting means being electrically connected to said circuit means and being arranged for mechanical connection to said exposure time setting means of the camera body unit.

8. A camera system according to claim 7, wherein said converting means comprises a variable resistor arranged to provide a range of different resistance values and electrically connected to said circuit means, said variable resistor being arranged for mechanical connection to said exposure time setting means of said camera body unit.

9. A camera system according to claim 7, wherein said first information providing means further comprises means for mechanically connecting said converting means with said exposure time setting means, said connecting means being arranged so as to establish mechanical cooperation of said converting means with said exposure time setting means upon attachment of said control unit to said camera body unit.

10. A camera system according to claim 2, wherein said first information providing means comprises manually operable means adapted to select a desired exposure time and arranged for mechanical connection with said exposure time setting means of said camera body unit; and means for converting exposure time value information set by said manually operable means to an electrical signal, said converting means being electrically connected to said circuit means and being mechanically connected to said manually operable means.

11. A camera system according to claim 10, wherein said converting means comprises a variable resistor arranged to provide a range of different resistance values, said variable resistor being electrically connected to said circuit means and being mechanically connected to said manually operable means.

12. A camera system according to claim 10, wherein said manually operable means is mechanically associated with said mode selecting means so that when said manually operable means is set to a position within an exposure time setting range, said circuit means is caused to operate according to said first operation mode and when said operable means is set to a non-setting position, said circuit means is caused to operate according to said second operation mode.

13. A camera system according to claim 2, wherein said control unit further has manually operable means for said mode selecting means, said operable means being arranged to be movable between an exposure time setting range and a non-setting position and adapted for mechanical connection with said exposure time setting means of said camera body unit, and said mode selecting means being mechanically associated with said manually operable means and electrically connected to said circuit means so that when said manually operable means is set to a position within said setting range, said circuit means is caused to operate according to said first operation mode, and when said manually operable means is set to said non-setting position, said circuit means is caused to operate according to said second operation mode.

14. A camera system according to claim 2, wherein said control unit further has means for operatively interconnecting said second information providing means and said second control means with said aperture value setting means, said interconnecting means being mechanically connected with said second information providing means and said second control means.

15. A camera system according to claim 14, wherein said second information providing means comprises means for converting said aperture value information set by said aperture value setting means to an electrical signal, said converting means being electrically connected to said circuit means and being mechanically connected to said interconnecting means.

16. A camera system according to claim 15, wherein said converting means comprises a variable resistor arranged to provide a range of different resistance values, said variable resistor being electrically connected to said circuit means and being mechanically connected to said interconnecting means.

17. A camera system according to claim 14, wherein said second control means comprises an electrical motor electrically connected to said circuit means and drivingly connected to said interconnecting means.

18. A camera system according to claim 2, further comprising means for interconnecting both of said second information providing means and said second control means to said aperture value setting means, said interconnecting means being arranged to be mechanically connected with said second information providing means, said second control means and said aperture value setting means.

19. A camera system according to claim 18, wherein said camera body unit further has a mechanism for connecting said interconnecting means to said aperture value setting means, said mechanism being mechanically connected to said aperture value setting means and being adapted for mechanical connection with said interconnecting means when said interconnecting means is attached to said camera body unit.

20. A camera system according to claim 18, wherein said second information providing means comprises means for converting said aperture value information set by said aperture value setting means to an electrical signal, said converting means being electrically connected to said circuit means and being adapted for mechanical connection with said interconnecting means.

21. A camera system according to claim 20, wherein said converting means comprises a variable resistor arranged to provide a range of different resistance values, said variable resistor being electrically connected to said circuit means and being adapted for mechanical connection with said interconnecting means.

22. A camera system according to claim 18, wherein said second control means comprises an electrical motor electrically connected to said circuit means and adapted for mechanical connection with said interconnecting means.

23. A camera system according to claim 1, wherein said control unit further has optical means arranged to constitute a part of a view finder optical system of the camera system when said control unit is attached to said camera body unit; said light measuring means being arranged to receive a portion of the light coming from the object and entering through said optical means.

24. A camera system according to claim 23, wherein said control unit further has means for setting the sensitivity of a film to be used, said film sensitivity setting means being electrically connected to said circuit means so as to provide film sensitivity information;

said circuit means determining said proper aperture value on the basis of the electrical output of said light measuring means and the exposure time value information set by said exposure time setting means together with the film sensitivity information set by said film sensitivity setting means in the state of said first operation mode and determining said proper exposure time value on the basis of the electrical output of said light measuring means and the aperture value information set by said aperture value setting means together with the film sensitivity information set by said film sensitivity setting means in the state of said second operation mode, and further determining said light amount to be emitted from said flash unit on the basis of the aperture value information set by said aperture value setting means and the electrical signal provided by said light responsive means together with the film sensitivity information set by said film sensitivity setting means in the state of said third operation mode.

25. A camera system according to claim 24, wherein said flash unit is attachable to and detachable from said camera body unit; and said detecting means comprises switch means arranged to select said light measuring means and said exposure time fixing means for electrical connection to said circuit means in such a manner that when said flash unit is attached to said camera body unit, said exposure time fixing means is brought into connection with said circuit means, and when said flash unit is detached from said camera body unit, said light measuring means is brought into connection to said circuit means.

26. A camera system according to claim 25, wherein said control unit is attachable to and detachable from said camera body unit.

27. An adaptor-type automatic exposure control unit for use with a camera body and a flash device, wherein the flash device includes;

flash light emitting means for emitting a flash light to an object to be photographed; and light responsive means arranged to receive the flash light emitted from said emitting means and then reflected from said object, said responsive means providing an electrical signal when receiving said reflected flash light; and the camera body includes:

shutter means arranged to provide different exposure times;

exposure time setting means for said shutter means, said exposure time setting means being arranged to select an exposure time value;

diaphragm means arranged to provide different aperture sizes;

aperture value setting means for said diaphragm means, said aperture value setting means being arranged to select an aperture value;

detecting means for detecting a state of preparation for flash photographing of said flash device; and change-over means responsive to said detecting means; said control unit being detachably mountable on said camera body and comprising:

(a) light measuring means for measuring the brightness of said object, said measuring means providing an electrical output representing the object brightness;

(b) exposure time fixing means for fixing the exposure time to a value suitable for the flash photographing;

(c) exposure control circuit means for determining a proper exposure value, said circuit means being arranged to selectively receive the electrical output of said light measuring means, exposure time value information set by said exposure time setting means, exposure time value information fixed by said exposure time fixing means, aperture value information set by said aperture value setting means and the electrical signal provided by said light responsive means and arranged to be selectively operable according to the following three operation modes:

(i) a first operation mode in which said circuit means determines a proper aperture value on the basis of the electrical output of said light measuring means and the exposure time value information set by said exposure time setting means and controls said shutter means according to the exposure time value information set by the exposure time setting means;

(ii) a second operation mode in which said circuit means determines a proper exposure time value on the basis of the electrical output of said light measuring means and the aperture value information set by said aperture value setting means and controls said shutter means according to the determined proper exposure time value information; and (iii) a third operation mode in whih said circuit means determines the light amount to be emitted from said flash unit on the basis of the aperture value information set by said aperture value setting means and the electrical signal provided by said light responsive means and controls said shutter means according to the exposure time value information fixed by said exposure time fixing means; and (d) mode selecting means for selecting the operation mode of said circuit means between said first and second operation modes, said mode selecting means being operable manually from outside the unit;

said change-over means of the camera body being capable of selecting the operation mode of said circuit means between said second and third operation modes in response to said detecting means and changing the operation mode of the circuit means from the second operation mode to the third operation mode by connecting said exposure time fixing means to the circuit means while disconnecting said light measuring means from the circuit means in the state of said second operation mode when said detecting means detects the completion of preparation for the flash photograhing of said flash device;

whereby automatic exposures according to exposure time preselection mode, aperture value preselection mode and flash photographing mode are made possible.

28. A control unit according to claim 27, wherein said exposure time setting means of the camera body has a non-selecting position incapable of selecting any exposure time values beyond a selecting range thereof; and said mode selecting means is operatively associated with said exposure time setting means upon the attachment of the control unit to the camera body and sets the operation mode of the circuit means to said first operation mode when the exposure time setting means is at a selecting position within said selecting range while sets the operation mode of the circuit means to said second operation mode when the exposure time setting means is at said non-selecting position.

29. A control unit according to claim 28, further comprising:

(a) first means for providing said exposure time value information set by said exposure time setting means to the circuit means;

(b) second means for providing said aperture value information set by said aperture value setting means to the circuit means;

(c) first control means for controlling the operation of said shutter means in accordance with the exposure value representing the exposure time derived from said circuit means; and (d) second control means for controlling said diaphragm means in accordance with the exposure value representing the aperture value derived from said circuit means.

30. A control unit according to claim 29, wherein said flash device is freely attachable to and detachable from the camera body and said detecting means of the camera body detects the attachment of the flash device to the camera body, said control unit further comprising:

terminal means for electrically connecting said light measuring means, said exposure time fixing means and said circuit means with said change-over means of the camera body upon the attachment of the control unit to the camera body so that the light measuring means is electrically connected to the circuit means through the change-over means when the detecting means does not detect the attachment of the flash device to the camera body and the exposure time fixing means is electrically connected to the circuit means through the changeover means when the detecting means detects the attachment of the flash device to the camera body.

31. A single lens reflex camera system comprising:
(a) a camera body unit having:
 (1) shutter means arranged to provide different exposure times;
 (2) first exposure time setting means for said shutter means, said first exposure time setting means being arranged to select an exposure time value; and
 (3) detecting means for detecting a state of preparation for flash photographing;
(b) an objective lens unit having:
 (1) objective lens means;
 (2) diaphragm means arranged to provide different aperture sizes; and
 (3) aperture value setting means for said diaphragm means, said aperture value setting means being arranged to select an aperture value;
(c) a flash unit for the flash photographing, said flash unit having:
 (1) a flash light emitting means for emitting a flash light to an object to be photographed; and
 (2) light responsive means arranged to receive the flash light emitted from said emitting means and then reflected from said object, said responsive means providing an electrical signal when receiving said reflected flash light; and
(d) a view finder unit for automatic exposure control, said finder unit having:
 (1) view finder optical means adapted for viewing an object image formed by said objective lens means;
 (2) light measuring means for measuring the object brightness, said light measuring means being arranged to receive object light coming through said objective lens means and at least a portion of said view finder optical means and providing an electrical output representing the object brightness;
 (3) exposure time fixing means for fixing the exposure time to a value suitable for the flash photographing;
 (4) exposure control circuit means for determining a proper exposure value, said circuit means being arranged to selectively receive the electrical output of said light measuring means, exposure time value information set by said exposure time setting means, exposure time value information fixed by said exposure time fixing means, aperture value information set by said aperture value setting means and the electrical signal provided by said light responsive means and arranged to be selectively operable according to the following three operation modes:
  (i) a first operation mode in which said circuit means determines a proper aperture value on the basis of the electrical output of said light measuring means and the exposure time value information set by said exposure time setting means and controls said shutter means according to the exposure time value information set by the exposure time setting means;
  (ii) a second operation mode in which said circuit means determines a proper exposure time value on the basis of the electrical output of said light measuring means and the aperture value information set by said aperture value setting means and controls said shutter means according to the determined proper exposure time value information; and
  (iii) a third operation mode in which said circuit means determines the light amount to be emitted from said flash unit on the basis of the aperture value information set by said aperture value setting means and the electrical signal provided by said light responsive means and controls said shutter means according to the exposure time value information fixed by said exposure time fixing means; and
 (5) mode selecting means for selecting the operation mode of said circuit means between said first and second operation modes, said mode selecting means being manually operable from outside said finder unit;
said detecting means of the camera body unit detecting the state of preparation for the flash photographing of said flash unit and changing the operation mode of said circuit means from said second operation mode to said third operation mode by connecting said exposure time fixing means to the circuit means while disconnecting said light measuring means from the circuit means in the state of said second operation mode when detecting the completion of preparation for the flash photographing of the flash unit;
whereby automatic exposures according to exposure time preselection mode, aperture value preselection mode and flash photographing mode are made possible.

32. A single lens reflex camera system according to claim 31, wherein said exposure time setting means of the camera body unit has a non-selecting position incapable of selecting any effective exposure time values beyond a selecting range thereof; and said mode selecting means of the view finder unit is operatively associated with said exposure time setting means upon the attachment of the finder unit to the camera body unit and sets the operation mode of the circuit means to said first operation mode when the exposure time setting means is at a selecting position within said selecting range while setting the operation mode of the circuit means to said second operation mode when the exposure time setting means is at said non-selecting position.

33. A single lens reflex camera system according to claim 32, wherein said flash unit is attachable to and detachable from said camera body unit, and said detecting means comprises switch means being arranged to select said light measuring means and said exposure time fixing means for electrical connection to said circuit means in such a manner that when said flash unit is attached to said camera body unit, said exposure time fixing means is brought into connection with said circuit means, and when said flash unit is detached from said camera body unit, said light measuring means is brought into connection to said circuit means.

34. A single lens reflex camera system according to claim 33, wherein said view finder unit includes:
(a) first means for providing said exposure time value information set by said exposure time setting means to the circuit means;

(b) second means for providing said aperture value information set by said aperture value setting means to the circuit means;

(c) first control means for controlling the operation of said shutter means in accordance with the exposure value representing the exposure time derived from said circuit means; and (d) second control means for controlling said diaphragm means in accordance with the exposure value representing the aperture value derived from said circuit means.

35. A view finder adaptor unit for use with a camera body, an objective lens assembly and a flash device, wherein the flash device includes:

flash light emitting means for emitting a flash light to an object to be photographed; and light responsive means arranged to receive the flash light emitted from said emitting means and then reflected from said object, said responsive means providing an electrical signal when receiving said reflected flash light;

the camera body includes:

shutter means arranged to provide different exposure times;

first exposure time setting means for said shutter means, said first exposure time setting means being arranged to select an exposure time value;

detecting means for detecting state of preparation for flash photographing of said flash device; and change-over means responsive to said detecting means; and the objective lens assembly includes:

objective lens means;

diaphragm means arranged to provide different aperture sizes; and aperture value setting means for said diaphragm means, said aperture value setting means being arranged to select an aperture value; said view finder adaptor unit being detachably mountable on the camera body and comprising:

(a) view finder optical means adapted for viewing an object image formed by said objective lens means;

(b) light measuring means for measuring the object brightness, said light measuring means being arranged to receive an object light coming through said objective lens means and at least a portion of said view finder optical means and providing an electrical output representing the object brightness;

(c) exposure time fixing means for fixing the exposure time to a value suitable for the flash photographing;

(d) exposure control circuit means for determining a proper exposure value, said circuit means being arranged to selectively receive the electrical output of said light measuring means, exposure time value information set by said exposure time setting means, exposure time value information fixed by said exposure time fixing means, aperture value information set by said aperture value setting means and the electrical signal provided by said light responsive means and arranged to be selectively operable according to the following three operation modes:

(i) a first operation mode in which said circuit means determines a proper aperture value on the basis of the electrical output of said light measuring means and the exposure time value information set by said exposure time setting means and controls said shutter means according to the exposure time value information set by the exposure time setting means;

(ii) a second operation mode in which said circuit means determines a proper exposure time value on the basis of the electrical output of said light measuring means and the aperture value information set by said aperture value setting means and controls said shutter means according to the determined proper exposure time value information; and (iii) a third operation mode in which said circuit means determines the light amount to be emitted from said flash unit on the basis of the aperture value information set by said aperture value setting means and the electrical signal provided by said light responsive means and controls said shutter means according to the exposure time value information fixed by said exposure time fixing means; and (e) mode selecting means for selecting the operation mode of said circuit means between said first and second operation modes, said mode selecting means being manually operable from outside said adaptor unit;

said change-over means of the camera body being capable of selecting the operation mode of said circuit means between said second and third operation modes in response to said detecting means and changing the operation mode of the circuit means from the second operation mode to the third operation mode by connecting said exposure time fixing means to the circuit means while disconnecting said light measuring means from the circuit means in the state of said second operation mode when said detecting means detects the completion of preparation for the flash photographing of said flash device;

whereby automatic exposures according to exposure time preselection mode, aperture value preselection mode and flash photographing mode are made possible.

36. A view finder adaptor unit according to claim 35, wherein said exposure time setting means of the camera body has a non-selecting position incapable of selecting any exposure time values beyond a selecting range thereof; and said mode selecting means is operatively associated with said exposure time setting means upon the attachment of the control unit to the camera body and sets the operation mode of the circuit means to said second operation mode when the exposure time setting means is at said non-selecting position.

37. A view finder adaptor unit according to claim 36, further comprising:

(a) first means for providing said exposure time value information set by said exposure time setting means to the circuit means;

(b) second means for providing said aperture value information set by said aperture value setting means to the circuit means;

(c) first control means for controlling the operation of said shutter means in accordance with the exposure value representing the exposure time derived from said circuit means; and (d) second control means for controlling said diaphragm means in accordance with the exposure value representing the aperture value derived from said circuit means.

38. A view finder adaptor unit according to claim 37, wherein said flash device is freely attachable to and detachable from the camera body and said detecting means of the camera body detects the attachment of the flash device to the camera body;

and said adaptor unit further comprises:

terminal means for electrically connecting said light measuring means, said exposure time fixing means and said circuit means with said change-over means of the camera body upon the attachment of the adaptor unit to the camera body so that the light measuring means is electrically connected to the circuit means through the change-over means when the detecting means does not detect the attachment of the flash device to the camera body and the exposure time fixing means is electrically connected to the circuit means through the change-over means when the detecting means detects the attachment of the flash device to the camera body.

39. A camera system comprising:
(a) a camera body having:
 (1) a shutter device operable to provide different exposure times;
 (2) a manually operable time value setting means for setting an exposure time value to said shutter device, said time value setting means having a setting range for setting different time values and a non-setting position incapable of setting any time values;
 (3) a diaphragm device operable to provide different exposure aperture sizes; and
 (4) a manually operable aperture value setting means for setting an exposure aperture value to said diaphragm device; and
(b) an automatic exposure control unit being removably attached to the camera body and having:
 (1) operation means adapted for operating said time value setting means from the control unit side;
 (2) first means for providing a first electrical signal corresponding to the set time value set by said time value setting means within the setting range thereof;
 (3) second means for providing a second electrical signal corresponding to the set aperture value set by said aperture value setting means;
 (4) first connecting means adapted for operatively connecting said second providing means to said aperture value setting means;
 (5) exposure operation circuit means for determining a proper exposure value, said operation circuit means being arranged to be selectively operable according to a first operation mode in which the operation circuit means determines a proper aperture value on the basis of the first electrical signal provided by said first providing means and provides a first electrical output corresponding to the determined aperture value and a second operation mode in which the operation circuit means determines a proper time value on the basis of the second electrical signal provided by said second providing means and provides a second electrical output corresponding to the determined aperture value;
 (6) adjusting means for automatically adjusting said aperture value setting means to a value determined by said operation circuit means in the state of said first operation mode thereof, said adjusting means including:
  (a) output means capable of actuating said first connecting means to adjust the aperture value setting means; and
  (b) comparison means receiving both of said first electrical output of the operation circuit means and said second electrical signal provided by said second providing means and comparing the second electrical signal with the first electrical output, said comparison means providing said output means with a control signal representing the termination of adjustment of the aperture value setting means when the second electrical signal provided by the second providing means matches with the first electrical output of the operation circuit means;
 (7) shutter control circuit means for controlling said shutter device, said control circuit means being capable of controlling the shutter device according to the determined time value determined by said operation circuit means by receiving said second electrical output of the operation circuit means in the state of said second operation mode thereof;
 (8) second connecting means adapted for electrically connecting said control circuit means to said shutter device; and
 (9) control means for controlling the input supply of said second electrical signal provided by said second providing means for said operation circuit means, said control means being operatively associated with said operation means and allowing the input supply of said second electrical signal for said operation circuit means only when the operation means is set to a position corresponding to said non-setting position of said time value setting means;

whereby said operation circuit means operates according to said first operation mode when the time value setting means is set to a position within said setting range while operates according to said second operation mode only when the time value setting means is set to said non-setting position, and thus the automatic exposure in either of exposure time preselection mode and exposure aperture preselection mode is selectively made possible.

40. A camera system according to claim 39, wherein said control unit further includes:

selecting means for selecting the input supply of said first and second electrical outputs of said operation circuit means for said adjusting means and said shutter control circuit means, said selecting means being operatively associated with said operation means so that the selecting means allows the input supply of said first electrical output of the operation circuit means for the adjusting means when the operation circuit means operates according to said first operation mode while allows the input supply of said second electrical output of the operation circuit means for the shutter control circuit means when the operation circuit means operates according to said second operation mode.

41. A camera system according to claim 40, wherein said control unit further has:

memory means for selectively memorizing said first and second electrical output of said operation circuit means, said memory means being electrically connected to the operation circuit means, said selecting means being electrically connected to said memory means.

42. A camera system according to claim 41, wherein said first providing means of the control unit comprises a converting means for converting the set time value set by said time setting means to said first electrical signal, said converting means being operatively connected to said operation means.

43. A camera system according to claim 42, wherein said converting means is a variable resistor.

44. A camera system according to claim 41, wherein said time value setting means of the camera body comprises:

manually operable means adapted for selecting time values, said operable means being arranged for operative connection with said operation means of the control unit; and electrical means operatively connected to said operable means and providing said first electrical signal corresponding to the time value to be set to said shutter device;

and said first providing means of the control unit comprises terminal means arranged for electrical connection with said electrical means of the camera body.

45. A camera system according to claim 44, wherein said electrical means is a variable resistor.

46. A camera system according to claim 44, wherein said shutter control circuit means of the control unit is further capable of controlling said shutter device according to the set time value set by said time value setting means of the camera body by receiving said first electrical signal provided through said first providing means from said electrical means; and said control unit further includes:

change-over means for changing the input supply for said shutter control circuit means between said first electrical signal provided through said first providing means from said electrical means and said second electrical output of said operation circuit means, said change-over means being operatively associated with said operation means so that the change-over means allows the input supply of said first electrical signal provided through said first providing means from said electrical means for the shutter control circuit means when said operation circuit means operates according to said first operation mode while allows the input supply of said second electrical output of the operation circuit means for the shutter control circuit means, when the operation circuit means operates according to said second operation mode.

47. A camera system according to claim 41, wherein said second providing means of the control unit comprises a converting means for converting the set aperture value set by said aperture value setting means to said second electrical signal, said converting means being operatively connected to said first connecting means.

48. A camera system according to claim 47, wherein said converting means is a variable resistor.

49. A camera system according to claim 47, wherein said output means of said adjusting means includes an electrical motor arranged for operative connection with said first connecting means and a motor control circuit electrically connected to said comparison means and said motor.

50. A camera system according to claim 49, wherein said control unit further includes a clutch means for controlling the operative connection between said electrical motor and said first connecting means, said clutch means being operatively associated with said operation means so that the clutch means operatively connects the motor with the first connecting means when said operation circuit means operates according to said first operation mode while disconnecting the motor from the first connecting means when the operation circuit means operates according to said second operation mode.

51. A camera system according to claim 47, wherein said control unit further includes:

change-over means for changing said adjusting means between an operative state and an inoperative state, said change-over means being operatively associated with said operation means so that the change-over means sets the adjusting means to the operative state when said operation circuit means operates according to said first operation mode and also sets the adjusting means to the inoperative state when the operation circuit means operates according to said second operation mode.

52. A camera system according to claim 47, further comprising:

interconnecting means for operatively interconnecting said first connecting means of the control unit with said aperture value setting means of the camera body, said interconnecting means being removably attached to the control unit and the camera body, said converting means of the control unit being operatively connected with the aperture value setting means of the camera body through said first connecting means and said interconnecting means.

53. A view finder adaptor unit for use with a camera body and an objective lens assembly, wherein
the camera body includes:
a shutter device operable to provide different exposure times; and
manually operable time value setting means for setting an exposure time value to said shutter device, said time value setting means having a setting range for setting different time values and a non-setting position incapable of setting any time values;
and the lens assembly includes:
objective lens means forming an image of an object to be photographed;
a diaphragm device operable to provide different exposure aperture sizes; and
manually operable aperture value setting means for setting an exposure aperture value to said diaphragm device;
the adaptor unit being removably mountable on the camera body and comprising:
(a) view finder optical means adapted for viewing said object image formed by said objective lens means from the outside of the camera body;
(b) operation means adapted for operating said time value setting means from the control unit side;
(c) first means for providing a first electrical signal corresponding to the set time value set by said time value setting means within the setting range thereof;

(d) second means for providing a second electrical signal corresponding to the set aperture value by said aperture value setting means;

(e) first connecting means adapted for operatively connecting said second providing means to said aperture value setting means;

(f) exposure operation circuit means for determining a proper exposure value, said operation circuit means being arranged to be selectively operable according to a first operation mode in which the operation circuit means determines a proper aperture value on the basis of the first electrical signal provided by said first providing means and provides a first electrical output corresponding to the determined aperture value and a second operation mode in which the operation circuit means determines a proper time value on the basis of the second electrical signal provided by said second providing means and provides a second electrical output corresponding to the determined aperture value;

(g) adjusting means for automatically adjusting said aperture value setting means to a value determined by said operation circuit means in the state of said first operation mode thereof, said adjusting means including:

(1) output means capable of actuating said first connecting means to adjust the aperture value setting means; and (2) comparison means receiving both of said first electrical output of the operation circuit means and said second electrical signal provided by said second providing means and comparing the second electrical signal with the first electrical output, said comparison means providing said output means with a control signal representing the termination of adjustment of the aperture value setting means when the second electrical signal provided by the second providing means matches with the first electrical output of the operation circuit means;

(h) shutter control circuit means for controlling said shutter device, said control circuit means being capable of controlling the shutter device according to the determined time value determined by said operation circuit means by receiving said second electrical output of the operation circuit means in the state of said second operation mode thereof;

(i) second connecting means adapted for electrically connecting said control circuit means to said shutter device; and (j) control means for controlling the input supply of said second electrical signal provided by said second providing means for said operation circuit means, said control means being operatively associated with said operation means and allowing the input supply of said second electrical signal for said operation circuit means only when the operation means is set to a position corresponding to said non-setting position of said time value setting means;

whereby said operation circuit means operates according to said first operation mode when the time value setting means is set to a position within said setting range and also operates according to said second operation mode only when the time value setting means is set to said non-setting position, and thus the automatic exposure in either the exposure time preselection mode and exposure aperture preselection mode is selectively made possible.

54. An adaptor unit according to claim 53, further comprising a selecting means for selecting the input supply of said first and second electrical outputs of said operation circuit means for said adjusting means and said shutter control circuit means, said selecting means being operatively associated with said operation means so that the selecting means allows the input supply of said first electrical output of the operation circuit means for the adjusting means when the operation circuit means operates according to said first operation mode while allows the input supply of said second electrical output of the operation circuit means for the shutter control circuit means when the operation circuit means operates according to said second operation mode.

* * * * *